(12) United States Patent
Nakao

(10) Patent No.: US 12,096,469 B2
(45) Date of Patent: *Sep. 17, 2024

(54) TERMINAL, BASE STATION, INTEGRATED CIRCUIT AND SIGNAL TRANSMISSION CONTROL METHOD

(71) Applicant: Sun Patent Trust, New York, NY (US)

(72) Inventor: Seigo Nakao, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,367

(22) Filed: Jun. 26, 2023

(65) Prior Publication Data

US 2023/0337275 A1 Oct. 19, 2023

Related U.S. Application Data

(63) Continuation of application No. 17/723,301, filed on Apr. 18, 2022, now Pat. No. 11,729,817, which is a
(Continued)

(30) Foreign Application Priority Data

Sep. 3, 2010 (JP) ................. 2010-197768

(51) Int. Cl.
*H04W 74/00* (2009.01)
*H04L 5/00* (2006.01)
(Continued)

(52) U.S. Cl.
CPC ........... *H04W 74/006* (2013.01); *H04L 5/001* (2013.01); *H04L 5/0032* (2013.01);
(Continued)

(58) Field of Classification Search
CPC ..... H04W 72/04; H04W 80/04; H04W 84/12; H04W 88/06
See application file for complete search history.

(56) References Cited

U.S. PATENT DOCUMENTS 8,588,173 B2  11/2013  Horiuchi et al.
8,619,719 B2  12/2013  Wengerter et al.
(Continued)

FOREIGN PATENT DOCUMENTS

CN  101517987 A  8/2009
CN  101584142 A  11/2009
(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 9)," Technical Specification, 3GPP TS 36.212 V9.2.0, Jun. 2010, 61 pages.
(Continued)

*Primary Examiner* — Christine Ng
(74) *Attorney, Agent, or Firm* — Seed IP Law Group LLP

(57) ABSTRACT

Provided are a terminal, a base station and a signal transmission control method whereby a response signal can be efficiently transmitted when the terminal receives downstream allocation control information via an R-PDCCH. An extraction unit receives downstream control information via one of a first downstream control channel, which is transmitted by use of one or more control channel elements (CCE) associated with an upstream control channel resource, and a second downstream control channel different from the first downstream control channel, and also receives data via a data channel. A control unit selects, from resources associated with CCE and from particular resources reported by a base station, an upstream control channel resource to be used in transmission of the response signal, and controls the transmission of the response signal.

14 Claims, 19 Drawing Sheets

Related U.S. Application Data continuation of application No. 16/921,358, filed on Jul. 6, 2020, now Pat. No. 11,337,247, which is a continuation of application No. 16/417,144, filed on May 20, 2019, now Pat. No. 10,743,342, which is a continuation of application No. 15/615,577, filed on Jun. 6, 2017, now Pat. No. 10,342,039, which is a continuation of application No. 14/748,013, filed on Jun. 23, 2015, now Pat. No. 9,706,569, which is a continuation of application No. 13/813,615, filed as application No. PCT/JP2021/004631 on Aug. 19, 2011, now Pat. No. 9,100,955.

(51) Int. Cl.
| | | |
|---|---|---|
| H04W 72/23 | (2023.01) | |
| H04L 1/1607 | (2023.01) | |
| H04L 1/1829 | (2023.01) | |
| H04W 72/0453 | (2023.01) | |
| H04W 84/04 | (2009.01) | |

(52) U.S. Cl.
CPC .......... *H04L 5/0053* (2013.01); *H04L 5/0094* (2013.01); *H04W 72/23* (2023.01); *H04L 1/1635* (2013.01); *H04L 1/1835* (2013.01); *H04L 5/0044* (2013.01); *H04L 5/0055* (2013.01); *H04L 5/0064* (2013.01); *H04W 72/0453* (2013.01); *H04W 84/042* (2013.01)

(56) References Cited

U.S. PATENT DOCUMENTS

| | | | | |
|---|---|---|---|---|
| 9,100,955 | B2* | 8/2015 | Nakao | H04L 5/0032 |
| 9,706,569 | B2* | 7/2017 | Nakao | H04L 5/0094 |
| 10,342,039 | B2* | 7/2019 | Nakao | H04W 74/006 |
| 10,743,342 | B2* | 8/2020 | Nakao | H04L 5/0032 |
| 11,337,247 | B2* | 5/2022 | Nakao | H04L 5/0032 |
| 11,729,817 | B2* | 8/2023 | Nakao | H04L 5/0053 370/329 |
| 2008/0242236 | A1* | 10/2008 | Spencer | H04L 1/1671 455/73 |
| 2010/0061345 | A1 | 3/2010 | Wengerter et al. | |
| 2010/0150089 | A1* | 6/2010 | Yu | H04L 5/0055 370/329 |
| 2010/0275083 | A1* | 10/2010 | Nam | H03M 13/6306 714/E11.131 |
| 2011/0116465 | A1 | 5/2011 | Miki et al. | |
| 2011/0134870 | A1 | 6/2011 | Horiuchi et al. | |
| 2011/0243066 | A1 | 10/2011 | Nayeb Nazar et al. | |
| 2011/0286413 | A1 | 11/2011 | Nishio et al. | |
| 2011/0292900 | A1* | 12/2011 | Ahn | H04L 1/1607 370/329 |
| 2011/0305179 | A1* | 12/2011 | Wang | H04W 76/14 370/328 |
| 2012/0093063 | A1* | 4/2012 | Yuan | H04L 5/0053 370/315 |
| 2012/0113831 | A1* | 5/2012 | Pelletier | H04L 5/0053 370/252 |
| 2013/0329667 | A1 | 12/2013 | Wengerter et al. | |
| 2015/0043476 | A1 | 2/2015 | Takeda et al. | |
| 2016/0056944 | A1 | 2/2016 | Cave et al. | |
| 2017/0013673 | A1 | 1/2017 | Uchino et al. | |

FOREIGN PATENT DOCUMENTS

| | | |
|---|---|---|
| JP | 2009272827 A | 11/2009 |
| JP | 2013197891 A | 9/2013 |
| JP | 2015154462 A | 8/2015 |
| WO | WO 2008031503 A1 | 3/2008 |
| WO | WO 2010016261 A1 | 2/2010 |
| WO | WO 2010087177 A1 | 8/2010 |

OTHER PUBLICATIONS

"3rd Generation Partnership Project; Technical Specification Group Radio Access Network; Evolved Universal Terrestrial Radio Access (E-UTRA); Physical Channels and Modulation (Release 9)," Technical Specification, 3GPP TS 36.211 V9.1.0, Mar. 2010, 85 pages.
"3rd Generation Partnership Project; Technical Specification Group Radio Access Network; Evolved Universal Terrestrial Radio Access (E-UTRA); Physical layer procedures (Release 9)," Technical Specification, 3GPP TS 36.213 V9.2.0, Jun. 2010, 80 pages.
English Translation Chinese Search Report dated Feb. 12, 2015, for corresponding CN Application No. 201180041311.7, 2 pages.
Ericsson, ST-Ericsson, "A/N transmission in the uplink for carrier aggregation," R1-100909, Agenda Item: 7.1.6, 3GPP TSG-RAN WG1 #60, San Francisco, USA, Feb. 22-26, 2010. (4 pages).
Extended European Search Report dated Mar. 30, 2015, for corresponding EP Application No. 11821271.1-1851 / 2613598, 22 pages.
Extended European Search Report, dated Apr. 19, 2017, for corresponding European Application No. 17161508.1-1875, 11 pages.
Ghosh et al., "LTE-Advanced: Next-Generation Wireless Broadband Technology," IEEE Wireless Communications, Jun. 2010, 14 pages.
Huawei, "ACK/NACK mapping for channel selection," R1-104497, 3GPP TSG RAN WG1 Meeting #62, Agenda Item: 6.2.2.1, Madrid, Spain, Aug. 23-27, 2010, 6 pages.
InterDigital Communications, LCC, "FDD Relay Type I Harq operation and RTT," R1-100290, 3GPP TSG-RAN WG1 Meeting #59bis, Agenda Item: 7.5.1, Valencia, Spain, Jan. 18-22, 2010, 18 pages.
InterDigital, "FDD Relay Type I Blackhaul interference and HARQ issues," R2-096893, 3GPP TSG-RAN WG2 Meeting #68, Agenda Item: 7.4.2, Jeju, Korea, Nov. 9-13, 2009, 18 pages.
International Search Report, mailed Nov. 22, 2011, for International Application No. PCT/JP2011/004631, 2 pages.
LG Electronics Inc., "Backhaul Control Channel Design in Downlink," R1-102700, Agenda Item: 6.6.1.2, TSG-RAN WG1 Meeting #61, Montreal, Canada, May 10-14, 2010, 5 pages.
LG Electronics, "UCI piggyback onto PUSCH in LTE-Advanced for CM preserving transmission," R1-095021, 3GPP TSG RAN WG1 #59, Agenda Item: 7.2.2, Jeju, Korea, Nov. 9-13, 2009, 4 pages.
LG Electronics, "UL ACK/NACK control channel design," R1-092123, 3GPP TSG RAN WG1 #57, Agenda Item: 15.4, San Francisco, USA, May 4-8, 2009, 8 pages.
Nakao et al., "Performance enhancement of E-UTRA uplink control channel in fast fading environments," IEEE 69th Vehicular Technology Conference, Apr. 26-29, 2006, pp. 1-5.
NEC Group, "Supporting frequency diversity and frequency selective R-PDCCH transmissions," R1-103062, Agenda Item: 6.6.1.2, TSG-RAN WG1#61, Montreal, Canada, May 10-14, 2010, 6 pages.
Panasonic, "ACK/NACK resource indication for carrier aggregation and SORTD," R1-104888, Agenda Item: 6.2.2.3 PUCCH Resource Allocation, 3GPP TSG RAN WG1 Meeting #62, Madrid, Spain, Aug. 23-27, 2010, 5 pages.
Panasonic, "PDCCH design for carrier aggregation," R1-092230 (Previously R1-091743), 3GPP TSG-RAN WG1 Meeting #57, Agenda Item: 15.4, San Francisco, USA, May 4-8, 2009, 10 pages.
Panasonic, "R-PDCCH placement," R1-102881, Agenda Item: 6.6.1.2 Backhaul control channel design, 3GPP TSG RAN WG1 Meeting #61, Montreal, Canada, May 10-14, 2010, 5 pages.
Panasonic, "Support of UL ACK/NACK channel selection for carrier aggregation," R1-102022, 3GPP TSG RAN WG1 Meeting #60bis, Agenda Item: 6.2.4.1 Method(s) for A/N multiplexing, Beijing, China, Apr. 12-16, 2010, 6 pages.
Panasonic, "UL ACK/NACK transmission on PUCCH for carrier aggregation," R1-091744, Agenda Item: 15.4, 3GPP TSG-RAN WG1 Meeting #57, San Francisco, USA, May 4-8, 2009. (3 pages).
Panasonic, "UL ACK/NACK transmission on PUCCH for carrier aggregation," R1-093469, 3GPP TSG-RAN WG1 Meeting #58, Agenda Item: 15.4, Aug. 24-28, 2009, Shenzhen, China, 4 pages.

(56) References Cited

OTHER PUBLICATIONS

Partial Supplementary European Search Report dated Feb. 18, 2015, for corresponding EP Application No. 11821271.1-1851 / 2613598, 7 pages.
Qualcomm Incorporated, "Interleaver for R-PDCCH," R1-103555, 3GPP TSG-RAN WG1 #61bis, Agenda Item: 6.6.1, Dresden, Germany, Jun. 28-Jul. 2, 2010, 4 pages.
Samsung, "DL backhaul design for Type I relay," R1-094100, 3GPP TSG RAN WG1 Meeting #58bis, Agenda Item: 7.8.1, Miyazaki, Oct. 12-16, 2009, 4 pages.
Samsung, "R-PDCCH search space design," R1-103040, Agenda Item: 6.6.1.2, 3GPP TSG RAN WG1 Meeting #61, Montreal, Canada, May 10-14, 2010, 3 pages.
ZTE, "Control Signaling Structure for Relay Link," R1-090641, Agenda Item: 12.5, TSG-RAN WG1 #56, Athens, Greece, Feb. 9-13, 2009, 3 pages.
ZTE, "Un PUCCH Resource Allocation and Multiplexing," R1-104564, TSG-RAN WG1 #62, Agenda Item: 6.6.4, Madrid, Spain, Aug. 23-27, 2010, 6 pages.
ZTE, "Uplink Control Channel Design for LTE-Advanced," R1-091702, Agenda Item: 15.4, TSG-RAN WG1 #57, San Francisco, USA, May 4-8, 2009. (6 pages).
ZTE, "Uplink control Channel Design for LTE-Advanced," R1-092464, TSG-RAN WG1 #57bis, Agenda Item: 15.4, San Francisco, USA, Jun. 29-Jul. 3, 2009, 6 pages.

\* cited by examiner

TERMINAL, BASE STATION, INTEGRATED CIRCUIT AND SIGNAL TRANSMISSION CONTROL METHOD

BACKGROUND

Technical Field

The claimed invention relates to a terminal, a base station and a signal transmission control method.

Description of the Related Art

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with a base station. Subsequently, the terminal reads BCH information to acquire base station-specific parameters (see, Non-Patent Literatures (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via Physical Downlink Control CHannel (PDCCH) as appropriate to the terminal with which a communication link has been established.

The terminal performs "blind-determination" on each of a plurality of pieces of control information included in the received PDCCH signals (i.e., Downlink (DL) Assignment Control Information: also referred to as Downlink Control Information (DCI)). To put it more specifically, each piece of the control information includes a Cyclic Redundancy Check (CRC) part and the base station masks this CRC part by the terminal ID of the transmission target terminal. Accordingly, until the terminal demasks the CRC part of the received piece of control information with its own terminal ID, the terminal cannot determine whether or not the piece of control information is intended for the terminal. In this blind-determination, if the result of demasking the CRC part indicates that the CRC operation is OK, the piece of control information is determined as being intended for the terminal.

Moreover, in 3GPP LTE, Automatic Repeat Request (ARQ) is applied to downlink data to terminals from a base station. To put it more specifically, each terminal feeds back response signals indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as response signals. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. The PDCCH includes one or more L1/L2 control channels (L1/L2 CCH). Each L1/L2 CCH consists of one or more Control Channel Elements (CCE). To put it more specifically, a CCE is the basic unit used to map the control information to PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for notifying the control information to the resource assignment target terminal. The base station maps the control information to physical resources corresponding to the CCEs of the L1/L2 CCH and transmits the mapped control information.

In addition, CCEs are associated with component resources of PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits response signals to the base station using the identified resources. However, when the L1/L2 CCH occupies a plurality of contiguous CCEs, the terminal transmits the response signals to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, (W0, W1, W2, W3) represent a length-4 Walsh sequence and (F0, F1, F2) represent a length-3 DFT sequence. As illustrated in FIG. 1, ACK or NACK response signals are primary-spread over frequency components corresponding to 1 SC-FDMA symbol by a ZAC sequence (length-12) in frequency-domain. To put it more specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: W0-W3 (may be referred to as Walsh Code Sequence)) and a DFT sequence (length-3: F0-F2). To put it more specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving downlink assignment control signals because the terminal performs blind-determination in each subframe to find downlink assignment control signals intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signals intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). In FIG. 2, however, "subcarriers" in the vertical axis of the drawing are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. To put it more specifically, optional data of the uplink data is punctured due to the response signals in the PUSCH resources. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communications than 3GPP LTE has started. 3GPP LTE-Advanced systems (may be referred to as "LTE-A system," hereinafter) follow 3GPP LTE systems (may be referred to as "LTE system," hereinafter). 3GPP LTE-Advanced is expected to introduce base stations and terminals capable of communicating with each other using a wideband frequency of 40 MHz or greater to realize a downlink transmission rate up to 1 Gbps or above.

In the LTE-A system, in order to simultaneously achieve backward compatibility with the LTE system and ultra-high-speed communications several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. Moreover, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the bandwidth and PUCCHs for LTE on both ends of the band. In addition, the term "component carrier" may be also referred to as "cell" in English in 3GPP LTE-Advanced.

The LTE-A system supports communications using a band obtained by aggregating several component carriers, so called "carrier aggregation." In general, throughput requirements for uplink are different from throughput requirements for downlink. For this reason, so called "asymmetric carrier aggregation" has been also discussed in the LTE-A system. In asymmetric carrier aggregation, the number of component carriers configured for any terminal compliant with the LTE-A system (hereinafter, referred to as "LTE-A terminal") differs between uplink and downlink. In addition, the LTE-A system supports a configuration in which the numbers of component carriers are asymmetric between uplink and downlink, and the component carriers have different frequency bandwidths.

FIG. 3 is a diagram provided for describing asymmetric carrier aggregation and a control sequence applied to individual terminals. FIG. 3 illustrates a case where the bandwidths and numbers of component carriers are symmetric between the uplink and downlink of base stations.

In FIG. 3, a configuration in which carrier aggregation is performed using two downlink component carriers and one uplink component carrier on the left is set for terminal 1, while a configuration in which the two downlink component carriers identical with those used by terminal 1 are used but uplink component carrier on the right is used for uplink communications is set for terminal 2.

Referring to terminal 1, an LTE-A base station and an LTE-A terminal included in the LTE-A system transmit and receive signals to and from each other in accordance with the sequence diagram illustrated in FIG. 3A. As illustrated in FIG. 3A, (1) terminal 1 is synchronized with the downlink component carrier on the left when starting communications with the base station and reads information on the uplink component carrier paired with the downlink component carrier on the left from a broadcast signal called system information block type 2 (SIB2). (2) Using this uplink component carrier, terminal 1 starts communications with the base station by transmitting, for example, a connection request to the base station. (3) Upon determining that a plurality of downlink component carriers need to be assigned to the terminal, the base station instructs the terminal to add a downlink component carrier. However, in this case, the number of uplink component carriers is not increased, and terminal 1, which is an individual terminal, starts asymmetric carrier aggregation.

In addition, in the LTE-A system to which carrier aggregation is applied, a terminal may receive a plurality of pieces of downlink data on a plurality of downlink component carriers at a time. In LTE-A, studies have been carried out on channel selection (also referred to as "multiplexing"), bundling and a discrete Fourier transform spread orthogonal frequency division multiplexing (DFT-S-OFDM) format as a method of transmitting a plurality of response signals for the plurality of pieces of downlink data. In channel selection, not only symbol points used for response signals, but also the resources to which the response signals are mapped are varied in accordance with the pattern of results of the error detection on the plurality of pieces of downlink data. Compared with channel selection, in bundling, ACK or NACK signals generated according to the results of error detection on the plurality of pieces of downlink data are bundled (i.e., bundled by calculating a logical AND of the results of error detection on the plurality of pieces of downlink data, provided that ACK=1 and NACK=0), and response signals are transmitted using one predetermine resource. In transmission using the DFT-S-OFDM format, a terminal jointly encodes (i.e., joint coding) the response signals for the plurality of pieces of downlink data and transmits the coded data using the format (see, NPL 5).

To put it more specifically, channel selection is a technique that varies not only the phase points (i.e., constellation points) of the response signals but also the resources used for transmission of the response signals on the basis of whether the response signals for the plurality of pieces of downlink data received on the plurality of downlink component carriers are ACK or NACK as illustrated in FIG. 4. Meanwhile, bundling is a technique that bundles ACK/NACK signals for the plurality of pieces of downlink data into a single set of signals and thereby transmits the bundled signals using one predetermined resource (see, NPLs 6 and 7).

A description will be herein provided regarding ARQ control using channel selection and bundling in a case where asymmetric carrier aggregation is applied to terminals, with reference to FIG. 4.

For example, as illustrated in FIG. 4, when a component carrier group consisting of downlink component carriers 1 and 2 and uplink component carrier 1 (may be referred to as "component carrier set" in English) is configured for terminal 1, downlink resource assignment information is first transmitted from a base station to terminal 1 on each of the PDCCHs of respective downlink component carriers 1 and 2, and downlink data is then transmitted using the resource corresponding to the downlink resource assignment information.

In channel selection, when a terminal succeeds in receiving the downlink data on component carrier 1 but fails to receive the downlink data on component carrier 2 (i.e., the response signals of component carrier 1 are ACK and the response signals of component carrier 2 are NACK), the response signals are mapped to a PUCCH resource in PUCCH region 1 and a first phase point (e.g., the phase point (1,0) and/or the like) is used as the phase point of the response signals. In addition, when a terminal succeeds in receiving the downlink data on component carrier 1 and succeeds in receiving the downlink data on component carrier 2, the response signals are mapped to a PUCCH resource in PUCCH region 2 and the first phase point is used. To put it more specifically, when there are two downlink component carriers, the results of error detection are represented in four patterns, and the four patterns can be represented by the combinations of two resources and two types of phase points.

In bundling, when succeeding in receiving both of the two pieces of downlink data (CRC=OK), terminal 1 calculates a logical AND of ACK (=1) for downlink component carrier 1 and ACK (=1) for downlink component carrier 2 and transmits the result of calculation, which is "1" (i.e., ACK), to the base station as bundled ACK/NACK signals. Meanwhile, when succeeding in receiving the downlink data on downlink component carrier 1 but failing to receive the downlink data on downlink component carrier 2, terminal 1 calculates a logical AND of ACK (=1) for downlink component carrier 1 and NACK (=0) for downlink component carrier 2 and transmits the result of calculation, which is "0" (i.e., NACK), to the base station as bundled ACK/NACK signals. Likewise, when failing to receive both of the pieces of downlink data, terminal 1 calculates a logical AND of NACK (=0) and NACK (=0) and feeds back "0" (i.e., NACK) to the base station as bundled ACK/NACK signals.

As described above, in bundling, only when succeeding in receiving all of the plurality of pieces of downlink data transmitted to the terminal, the terminal transmits only one ACK to the base station as bundled ACK/NACK signals, and when failing to receive even one piece of downlink data, the terminal transmits only one NACK to the base station as bundled ACK/NACK signals. In this manner, the overhead of the uplink control channels can be reduced. It should be noted that, each terminal transmits bundled ACK/NACK signals using a PUCCH resource having the lowest frequency or identification number (i.e., index), for example, among the PUCCH resources corresponding to the plurality of CCEs that have been occupied by the received plurality of downlink control signals.

Next, a description will be provided regarding a method of transmitting bundled ACK/NACK signals using the DFT-S-OFDM format with reference to FIG. 5. The coded data obtained by jointly encoding (i.e., joint coding) the response signals for the plurality of pieces of downlink data transmitted using the DFT-S-OFDM format includes the results of error detection for the respective downlink component carriers as individual pieces of data. The coded data that is obtained by jointly encoding (i.e., joint coding) the response signals for the plurality of pieces of downlink data and that includes the results of error detection for the respective downlink component carriers is hereinafter referred to as "bundled ACK/NACK signals" or "bundled response signals."

As the reference signals used for demodulating the bundled ACK/NACK signals, a "length-12 ZAC sequence (i.e., base sequence)" similar to the reference signals in LTE is used. To put it more specifically, a length-12 ZAC sequence is placed on the second and sixth SC-FDMA symbols and secondary-spread in association with a Walsh sequence (length-2: W'0, W'1). In addition, the spread signals are transformed into time-domain signals by IFFT. The processing described above is equivalent to the processing in which the signals obtained by transforming the ZAC sequence into the time-domain signals using IFFT processing is spread using a length-2 Walsh sequence.

As in the case of reference signals for ACK/NACK in LTE, the reference signals from different terminals are spread using sequences each corresponding to a different cyclic shift value (i.e., cyclic shift index) or a different Walsh sequence. Thus, base stations can demultiplex the plurality of code-multiplexed reference signals using the related art despreading and correlation processing.

In the DFT-S-OFDM format illustrated in FIG. 5, a "length-12 ZAC sequence" is used as the reference signals as described above. In this case, the signals consisting of 12 symbols are subjected to DFT processing and then primary-spread in 1 SC-FDMA symbol as bundled ACK/NACK signals. As described above, the response signals of one symbol obtained by BPSK modulation are primary-spread in 1 SC-FDMA symbol using a ZAC sequence (of length-12) in the frequency-domain in the LTE system. In contrast to the LTE system, when a "length-12 ZAC sequence" is used as the reference signals for reporting bundled ACK/NACK signals using DFT-S-OFDMA in the LTE-A system to which carrier aggregation is applied, the bundled ACK/NACK signals consisting of 12 symbols are subjected to DFT processing and primary-spread in 1 SC-FDMA symbol. It should be noted that, the bundled ACK/NACK signals consisting of 12 symbols include the results of error detection for the respective component carriers as individual pieces of data as described above.

Subsequently, the bundled ACK/NACK signals that have undergone DFT processing are placed on the first, third, fourth, fifth and seventh SC-FDMA symbols and spread in association with a DFT sequence (of length-5: F'0, F'1, F'2, F'3, F'4). Moreover, the spread signals are transformed into the time-domain signals by IFFT processing. The processing described above is equivalent to the processing in which the signals obtained by transformation into the time-domain signals using IFFT processing are multiplied by each component element of the length-5 DFT sequence.

The bundled ACK/NACK signals from different terminals are code-multiplexed herein by spreading the bundled ACK/NACK signals using different DFT sequences. To put it more specifically, since the bundled ACK/NACK signals are spread using the length-5 DFT sequence, bundled ACK/NACK signals from as many as five terminals can be code-multiplexed.

In addition, a cyclic prefix (CP) is added to each signal obtained by IFFT processing, and the signals of one slot consisting of seven SC-FDMA symbols are thus formed.

Hereinafter, the resources adopting the DFT-S-OFDM format structure and used for transmitting the bundled ACK/NACK signals are referred to as "bundled ACK/NACK resource." As illustrated in FIG. 5, when downlink data is transmitted using the DFT-S-OFDM format, the bundled ACK/NACK signals are placed on the data parts where downlink data is placed (i.e., first, third, fourth, fifth and seventh SC-FDMA symbols in the example in FIG. 5). In addition, the reference signals for demodulating the bundled ACK/NACK signals are time-multiplexed with the bundled ACK/NACK signals.

Moreover, the introduction of radio communication relay apparatuses (hereinafter, referred to as "relay station" or "RN: relay node") is set forth for the purpose of achieving an increase in the coverage in LTE-A (see, FIG. 6). Along with the introduction of relay stations, the standardization of downlink control channels from base stations to relay stations (hereinafter, referred to as "R-PDCCH") is in progress (e.g., see, NPLs 8, 9, 10 and 11). Currently, the following matters on R-PDCCH are discussed. FIG. 7 illustrates R-PDCCH regions.

(1) The mapping start position of an R-PDCCH in the time-domain direction is fixed to the fourth OFDM symbol from the top OFDM symbol in a single subframe. This position is fixed independently of the proportion of symbols occupied by a PDCCH in the time-domain direction.

(2) As a method of mapping an R-PDCCH in the frequency-domain direction, two assignment methods (i.e., distributed and localized methods) are supported.

(3) As the reference signals for demodulation, common reference signals (CRS) and demodulation reference signals (DM-RS) are supported. Base stations notify relay stations of which reference signals are used.

CITATION LIST

Non-Patent Literature

NPL 1 3GPP TS 36.211 V9.1.0, "Physical Channels and Modulation (Release 9)," May 2010
NPL 2 3GPP TS 36.212 V9.2.0, "Multiplexing and channel coding (Release 9)," June 2010
NPL 3 3GPP TS 36.213 V9.2.0, "Physical layer procedures (Release 9)," June 2010
NPL 4 Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009
NPL 5 Ericsson and ST-Ericsson, "A/N transmission in the uplink for carrier aggregation," R1-100909, 3GPP TSG-RAN WG1 #60, February 2010
NPL 6 ZTE, 3GPP RAN1 meeting #57, R1-091702, "Uplink Control Channel Design for LTE-Advanced," May 2009
NPL 7 Panasonic, 3GPP RAN1 meeting #57, R1-091744, "UL ACK/NACK transmission on PUCCH for Carrier aggregation," May 2009
NPL 8 3GPP TSG RAN WG1 meeting, R1-102700, "Backhaul Control Channel Design in Downlink," May 2010
NPL 9 3GPP TSG RAN WG1 meeting, R1-102881, "R-PDCCH placement," May 2010
NPL 10 3GPP TSG RAN WG1 meeting, R1-103040, "R-PDCCH search space design" May 2010
NPL 11 3GPP TSG RAN WG1 meeting, R1-103062, "Supporting frequency diversity and frequency selective R-PDCCH transmissions" May 2010

BRIEF SUMMARY

Technical Problem

The amount of resources in the resource region where a PDCCH intended for terminals served by a base station is mapped (hereinafter, referred to as "PDCCH region") may become insufficient. As a solution for the shortage of resources, it is thought that downlink assignment control information (i.e., DCI) intended for a terminal served by a base station is assigned in the abovementioned resource region where an R-PDCCH is mapped (hereinafter, referred to as "R-PDCCH region") (see, FIG. 8). However, whether the R-PDCCH region is actually used for transmission of DCI or transmission of normal downlink data is determined for each subframe according to scheduling by the base station.

In this case, even when a terminal receives downlink assignment control information via an R-PDCCH and receives downlink data, the abovementioned ARQ is also applied. However, the method of transmitting response signals in this case has not been sufficiently discussed yet.

It is an object of the claimed invention to provide a terminal, a base station and a signal transmission control method that make it possible to efficiently transmit response signals when a terminal receives downlink assignment control information via an R-PDCCH.

Solution to Problem

A terminal according to an aspect of the claimed invention includes: a receiving section that receives downlink control information via one of a first downlink control channel transmitted by one or a plurality of control channel elements (CCE) associated with a resource of an uplink control channel and a second downlink control channel different from the first downlink control channel and that receives a piece of data via a data channel; a generation section that generates response signals for the piece of data on the basis of the presence or absence of an error in the piece of data; and a control section that controls transmission of the response signals by selecting a resource of the uplink control channel used for the transmission of the response signals, from a resource associated with the CCE and a specific resource notified by a base station, according to whether the downlink control information is received via the first downlink control channel or the second downlink control channel.

A base station according to an aspect of the claimed invention includes: a transmitting section that transmits downlink control information via one of a first downlink control channel transmitted by one or a plurality of control channel elements (CCE) associated with a resource of an uplink control channel and a second downlink control channel different from the first downlink control channel and that transmits a piece of data via a data channel; and a receiving section that selects a resource used for transmission of response signals for the piece of data in a terminal, from a resource associated with the CCE and a specific resource notified to the terminal, according to whether the transmitting section has transmitted the downlink control information via the first downlink control channel or the second downlink control channel and that receives the response signals using the selected resource.

A signal transmission control method according to an aspect of the claimed invention includes: receiving downlink control information via one of a first downlink control channel associated with a resource of an uplink control channel and a second downlink control channel different from the first downlink control channel, and also receiving a piece of data via a data channel; generating response signals for the piece of data on the basis of the presence or absence of an error in the piece of data; and controlling transmission of the response signals by selecting a resource of the uplink control channel used for the transmission of the response signals, from a resource associated with the CCE and a specific resource notified by a base station, according to whether the downlink control information is received via the first downlink control channel or the second downlink control channel.

Advantageous Effects of Invention

According to the claimed invention, when a terminal receives downlink assignment control information via an R-PDCCH, response signals can be transmitted efficiently.

DETAILED DESCRIPTION

Figure 1:
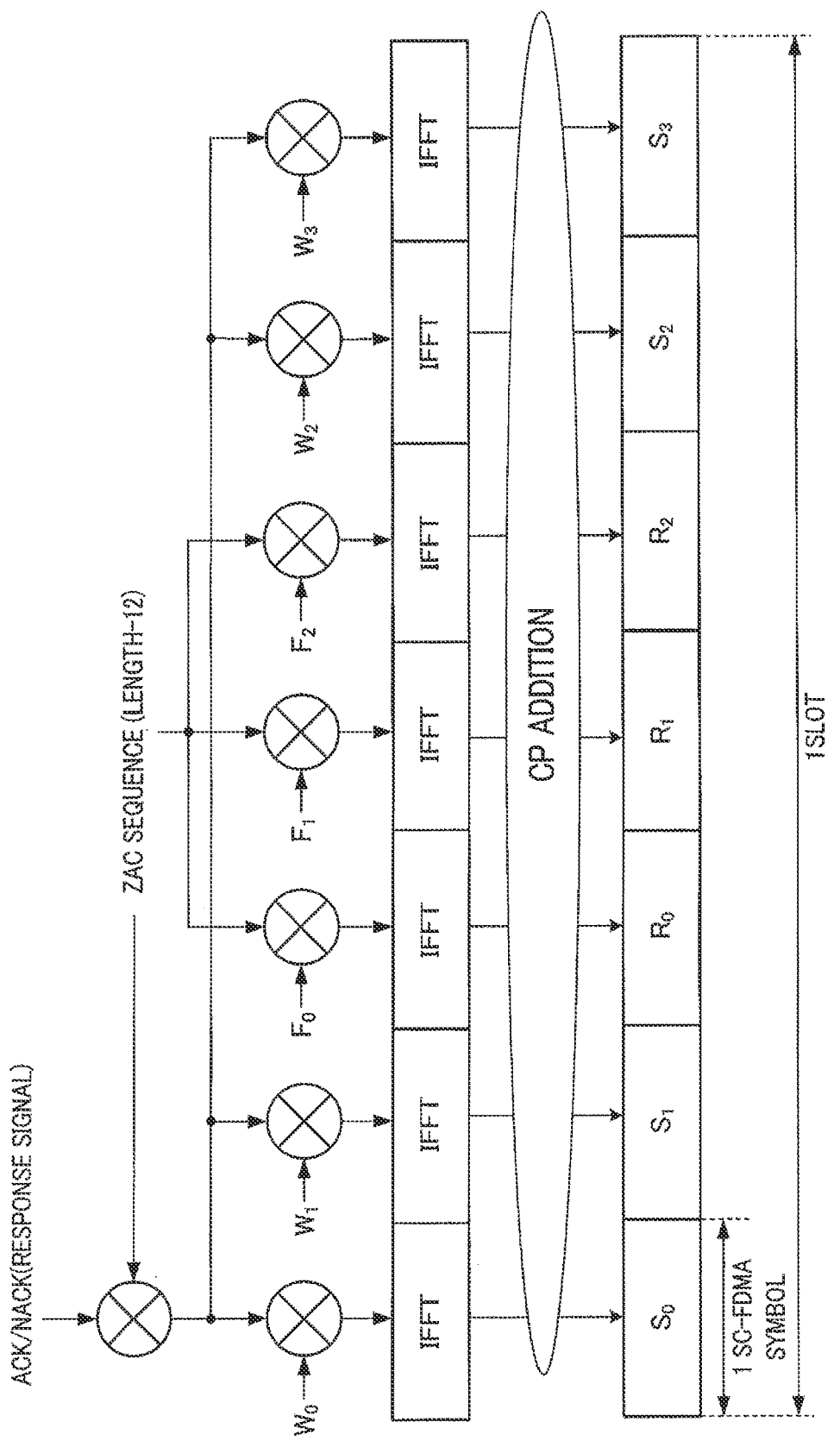
FIG. 1 is a diagram illustrating a method of spreading response signals and reference signals.
Figure 2:
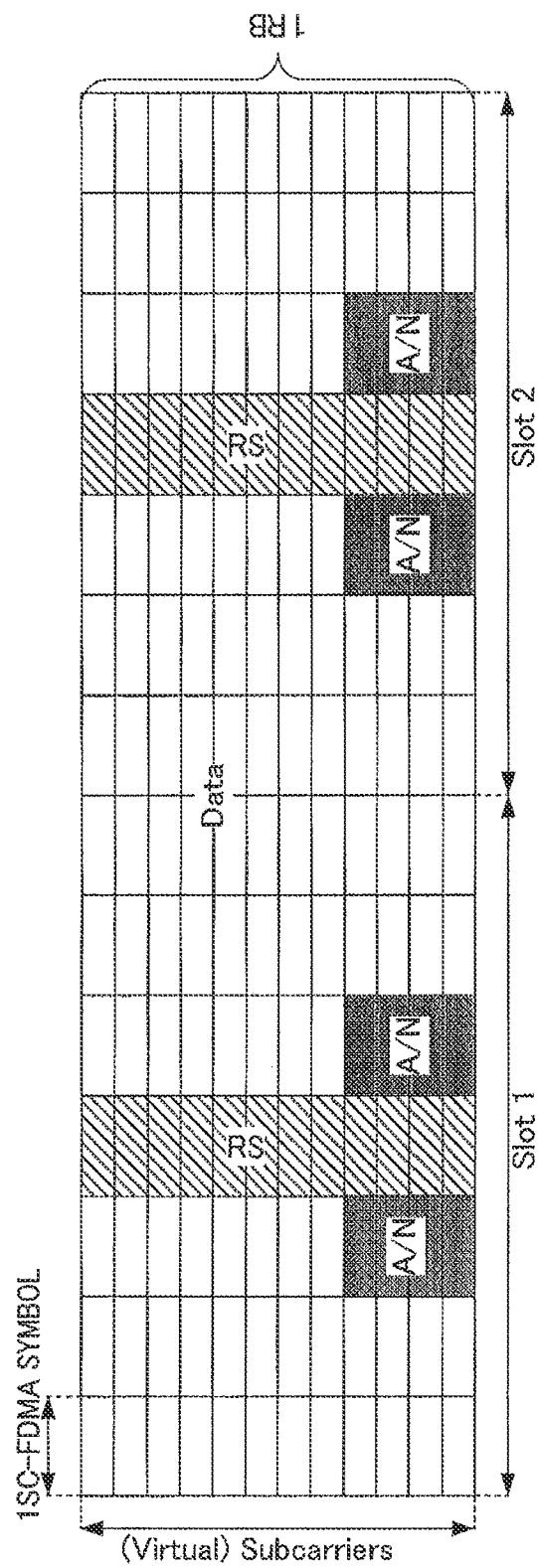
FIG. 2 is a diagram illustrating an operation related to a case where TDM is applied to response signals and uplink data on PUSCH resources.
Figure 3B:
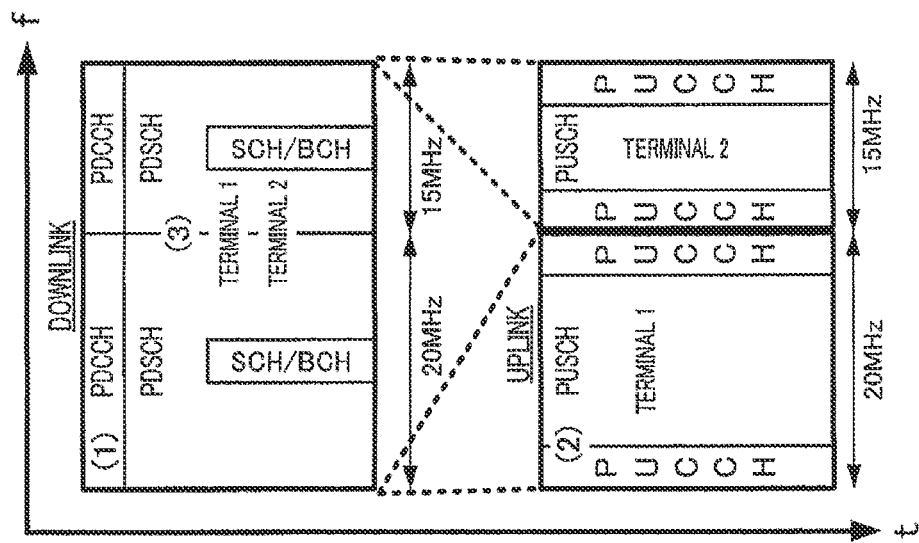
FIGS. 3A and 3B are diagrams provided for describing asymmetric carrier aggregation and a control sequence applied to individual terminals.
Figure 3A:
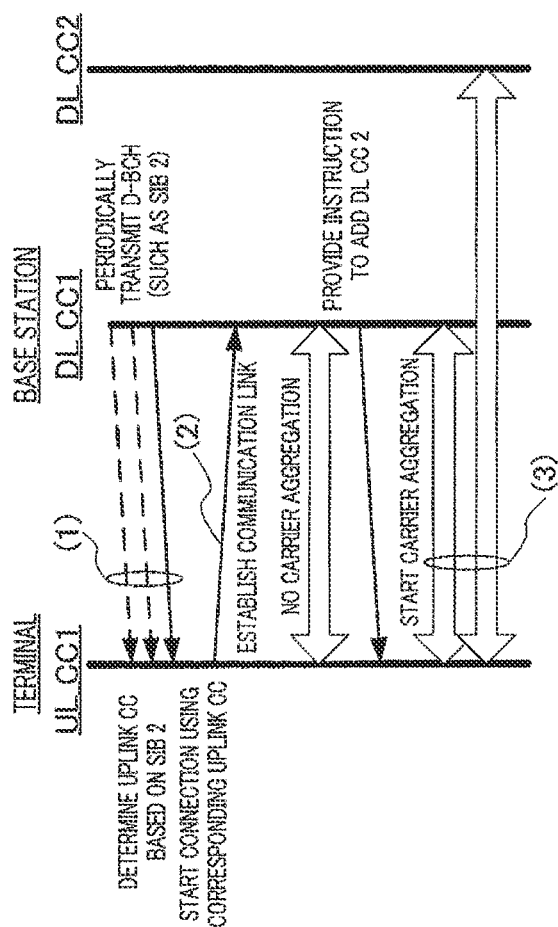
Figure 4:
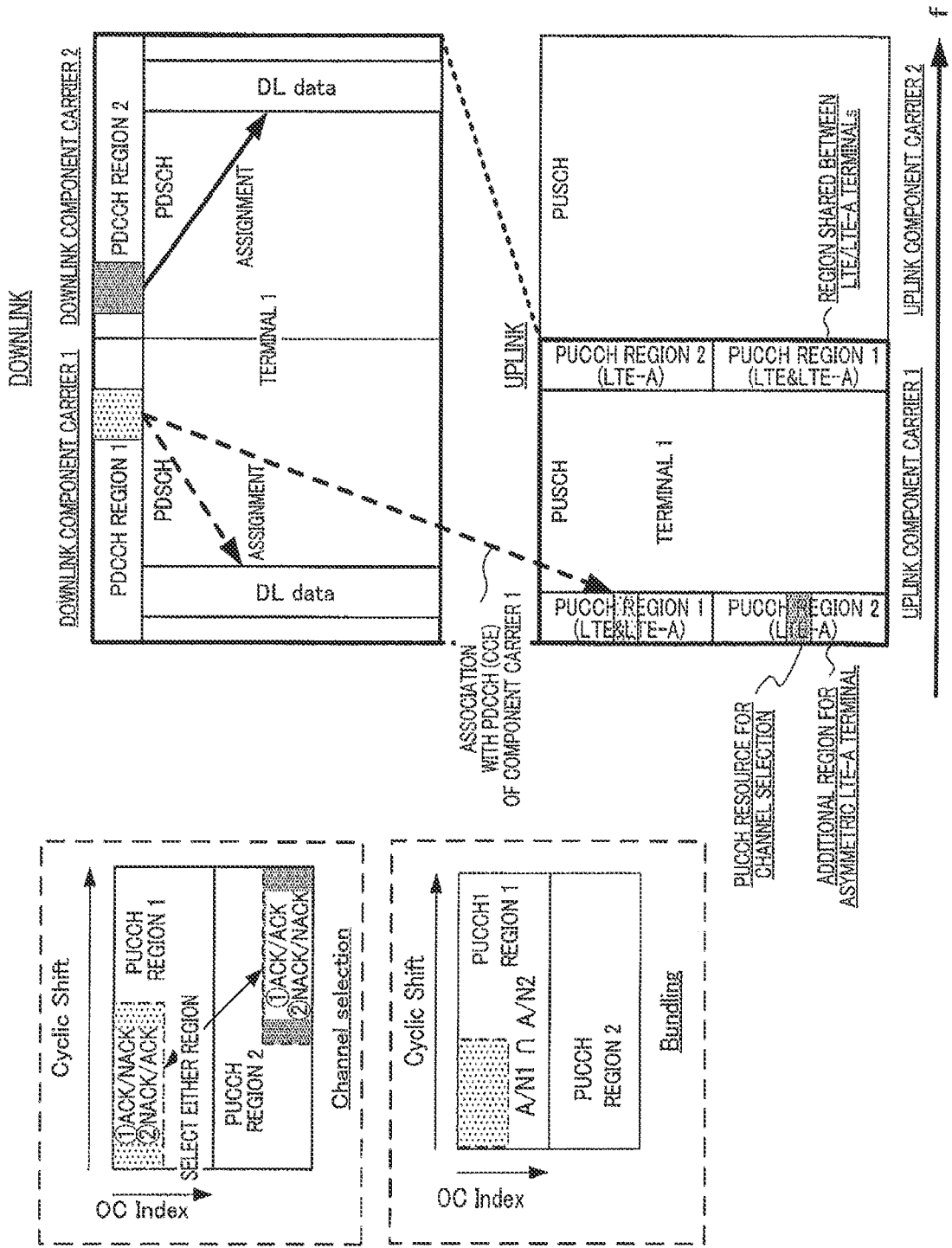
FIG. 4 is a diagram provided for describing asymmetric carrier aggregation and a control sequence applied to individual terminals.
Figure 5:
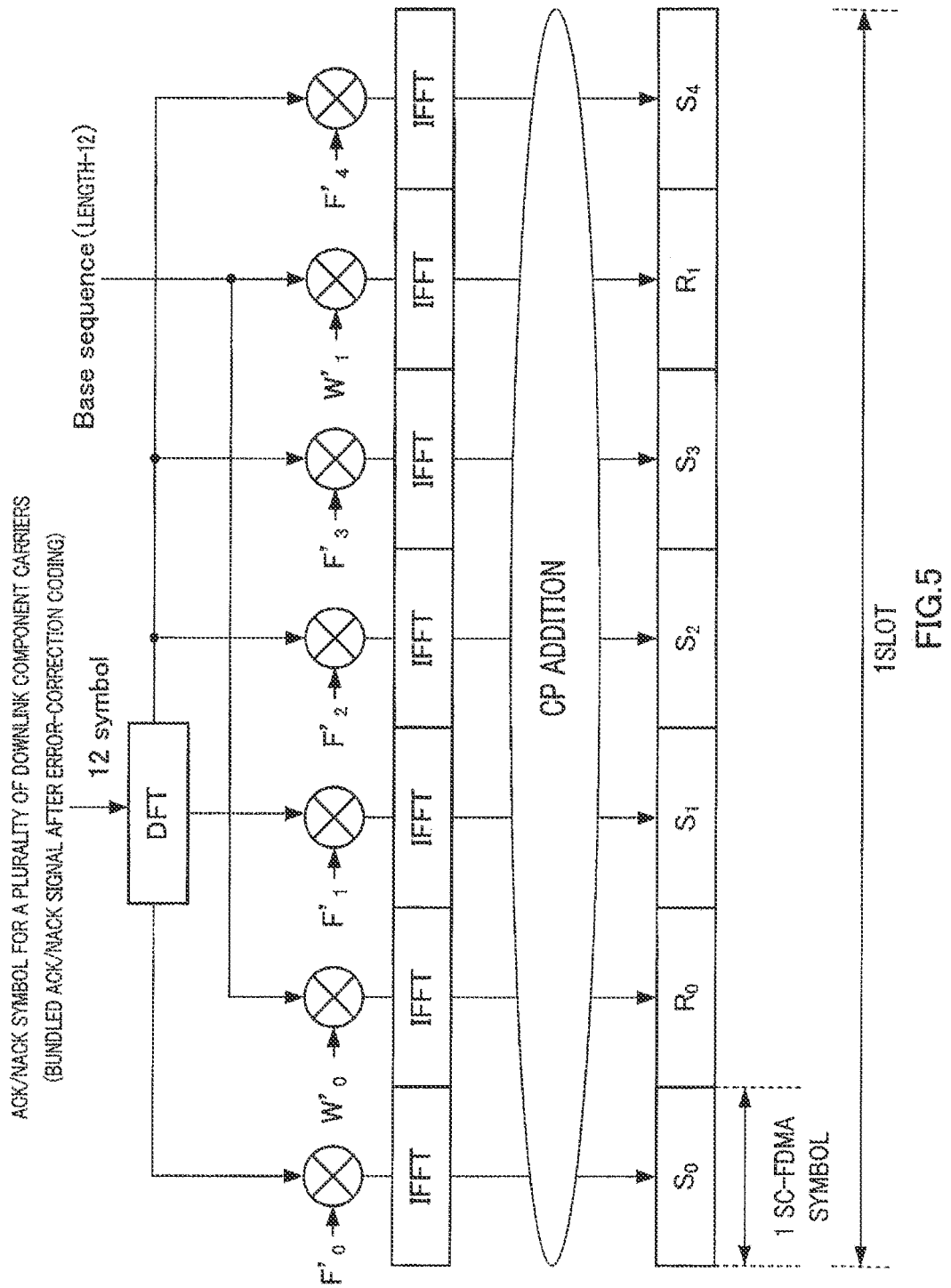
FIG. 5 is a diagram provided for describing ARQ control when carrier aggregation is applied to terminals.
Figure 6:
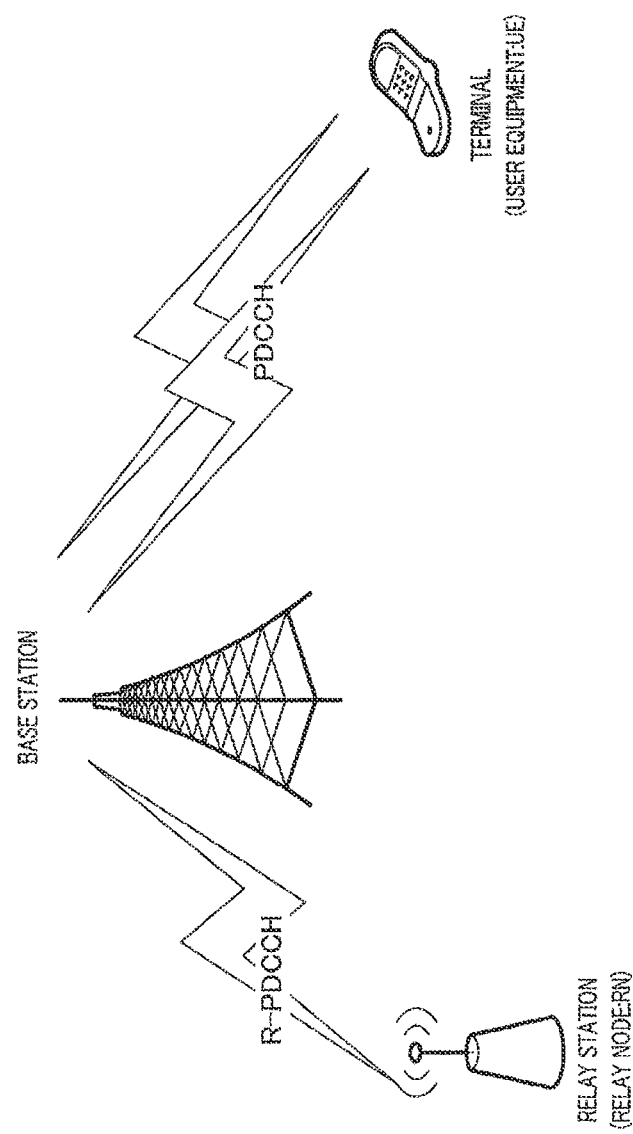
FIG. 6 is a diagram provided for describing a communication system that includes a radio communication relay apparatus.

Hereinafter, embodiments of the claimed invention will be described in detail with reference to the accompanying drawings. Throughout the embodiments, the same elements are assigned the same reference numerals and any duplicate description of the elements is omitted.

First of all, before specific configurations and operations of the embodiments are described, a description will be provided regarding a method to which the inventors of the specification have paid their attention as a method of transmitting response signals for downlink data (i.e., uplink response signals) when a terminal receives downlink assignment control information via an R-PDCCH.

The following two methods are considered as a possible method of transmitting response signals in uplink when a terminal receives downlink assignment control information via an R-PDCCH and receives downlink data.

One of the methods is to transmit response signals using a PUCCH resource associated in a one-to-one correspondence with a relay-control channel element (R-CCE) that has been occupied by an R-PDCCH (i.e., implicit signaling) (hereinafter, method 1) as in the case of an association between a PUCCH resource and a CCE that has been occupied by a PDCCH in LTE. To put it more specifically, when DCI intended for a terminal served by a base station is placed in an R-PDCCH region, each R-PDCCH occupies a resource consisting of one or a plurality of contiguous R-CCEs as in the case of PDCCHs. In addition, as the number of R-CCEs occupied by an R-PDCCH (i.e., the number of aggregated CCEs: relay CCE aggregation level), one of aggregation levels 1, 2, 4 and 8 is selected in accordance with the number of information bits of the assignment control information or a propagation path condition of the terminal, for example.

The other method is to previously notify a PUCCH resource to each terminal from a base station (i.e., explicit signaling) (hereinafter, method 2). To put it differently, each terminal transmits response signals using the PUCCH resource previously notified by the base station in method 2.

Each terminal can transmit response signals for downlink data using method 1 or method 2 even when receiving downlink assignment control information via an R-PDCCH.

However, method 1 requires that individual PUCCHs be associated with all R-CCEs that are distributed in the downlink frequency band, which causes a problem with the overhead of PUCCH resources. Moreover, as described above, an R-PDCCH is a resource region used temporarily when there is a shortage of PDCCH. For this reason, the R-PDCCH region is not necessarily used for transmission of DCI always. Accordingly, there is a possibility that the majority of PUCCH resources associated with R-CCEs may become useless in a certain time slot (i.e., certain subframe).

Meanwhile, method 2 requires that individual PUCCH resources be previously notified to all the terminals to which DCI may be transmitted using an R-PDCCH.

Accordingly, method 2 also involves a problem with the overhead of PUCCH.

In this respect, a description will be hereinafter provided regarding a terminal, a base station and a signal transmission control method that make it possible to reduce, as much as possible, the PUCCH required (to be secured) for transmission of response signals for downlink data when a terminal receives downlink assignment control information via an R-PDCCH.

Embodiment 1

Figure 9:
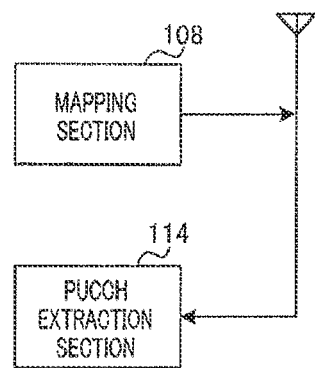
FIG. 9 is a block diagram illustrating a main configuration of a base station according to Embodiment 1 of the claimed invention.

FIG. 9 is a main configuration diagram of base station 100 according to Embodiment 1 of the claimed invention. In base station 100, a mapping section 108 maps downlink control information (DCI) to one of a PDCCH transmitted on one or a plurality of CCEs associated each with a PUCCH (uplink control channel) resource (i.e., first downlink control channel) and an R-PDCCH different from the PDCCH (i.e., second downlink control channel), and also maps data to a PDSCH (i.e., data channel). Accordingly, the DCI (downlink control information) is transmitted on one of the PDCCH and R-PDCCH, and the data is transmitted on a PDSCH. PUCCH extraction section 114 selects the resource used for transmission of response signals for data in terminal 200, from a resource associated with a CCE, and a specific resource notified to terminal 200 according to whether the PDCCH (i.e., first downlink control channel) or R-PDCCH (i.e., second downlink control channel) is used to transmit the DCI (downlink control information) in mapping section 108, and uses the selected resource to extract the response signals. Accordingly, the response signals for the data are received.

Figure 10:
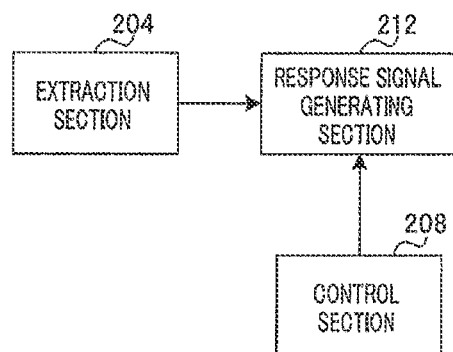
FIG. 10 is a block diagram illustrating a main configuration of a terminal according to Embodiment 1 of the claimed invention.

FIG. 10 is a main configuration diagram of terminal 200 according to Embodiment 1 of the claimed invention. In terminal 200, extraction section 204 extracts the DCI (downlink control information) using the PDCCH (i.e., first downlink control channel) transmitted on one or a plurality of CCEs associated with a PUCCH (i.e., uplink control channel) resource or the R-PDCCH (i.e., second downlink control channel) different from the PDCCH, and also extracts the data using the PDSCH (i.e., data channel). Accordingly, the DCI is received on one of the PDCCH and R-PDCCH, and the data is received on the PDSCH. Response signal generating section 212 generates response signals for the data on the basis of the presence or absence of error in the data. Control section 208 controls transmission of the response signals using a PUCCH (i.e., uplink control channel). In this case, control section 208 controls the transmission of response signals by selecting a PUCCH (i.e., uplink control channel) resource used for the transmission of response signals, from the resource associated with a CCE and the specific resource notified from base station 100, according to whether the DCI (downlink control information) is received on the PDCCH (i.e., first downlink control channel) or R-PDCCH (i.e., second downlink control channel).

(Configuration of Base Station)

Figure 11:
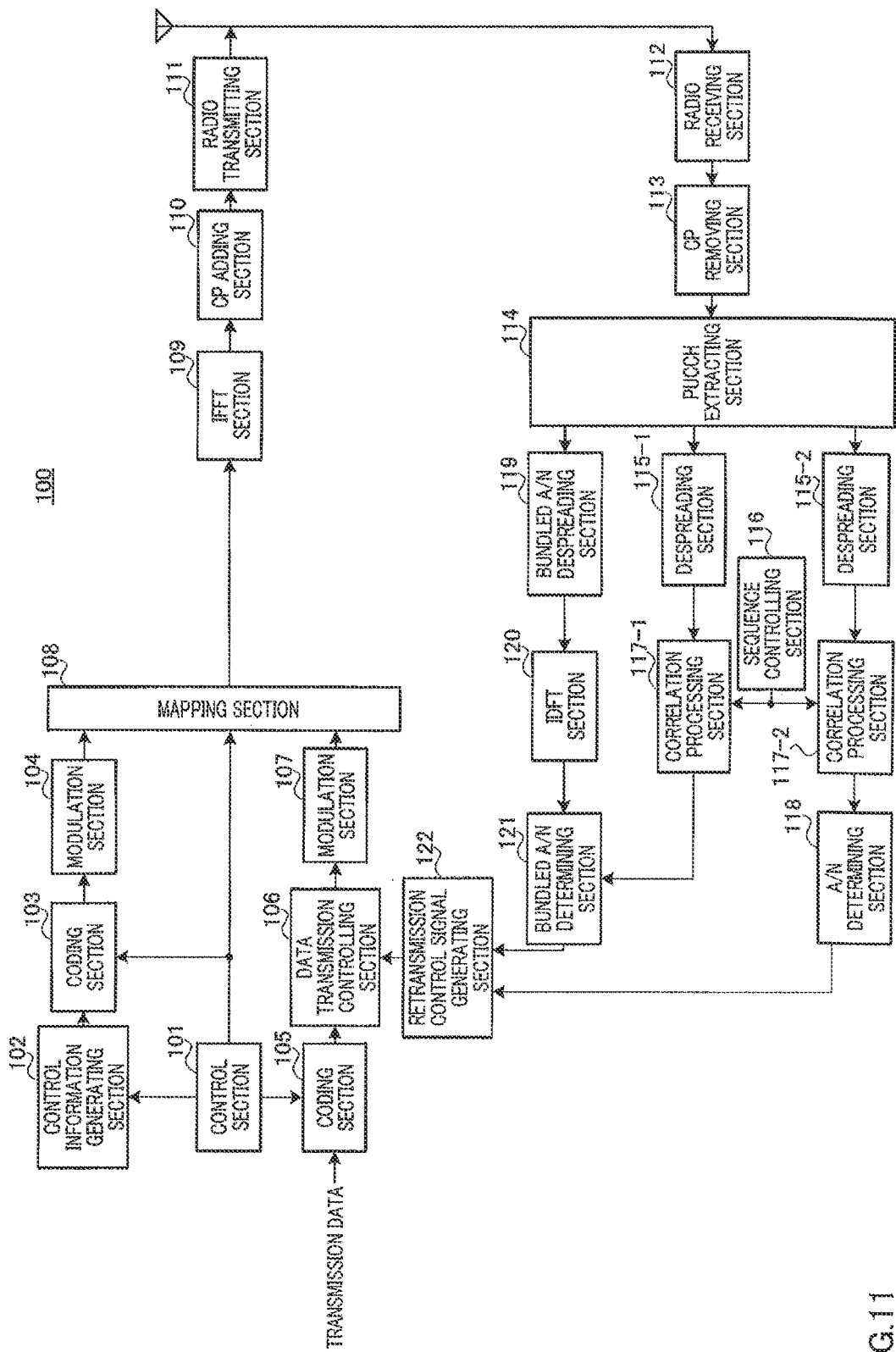
FIG. 11 is a block diagram illustrating a configuration of the base station according to Embodiment 1 of the claimed invention.

FIG. 11 is a block diagram of base station 100 according to Embodiment 1 of the claimed invention. In FIG. 11, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channels (i.e., PDCCH or R-PDCCH) in each downlink component carrier. Moreover, the downlink data assignment resource is selected from among the resources corresponding to downlink data channel (i.e., PDSCH) in each downlink component carrier. However, the resources corresponding to the PDSCH and R-PDCCH are partially or entirely overlap each other, so that base station 100 can divert the resources not used for the R-PDCCH to PDSCH. In addition, when there are a plurality of resource assignment target terminals 200, control section 101 assigns different resources to resource assignment target terminals 200, respectively.

The downlink control information assignment resources are equivalent to L1/L2 CCH described above. To put it more specifically, the downlink control information assignment resources are each formed of one or a plurality of CCEs (or R-CCEs, and may be referred to as "CCE" simply, without any distinction between CCE and R-CCE).

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and output the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)."

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 uses the transmission data (i.e., downlink data) for each destination terminal 200 and the coding rate information from control section 101 as input and encodes and outputs the transmission data to data transmission controlling section 106. However, when a plurality of downlink component carriers are assigned to destination terminal 200, coding section 105 encodes each piece of transmission data to be transmitted on a corresponding one of the downlink component carriers and transmits the coded pieces of transmission data to data transmission controlling section 106.

Data transmission controlling section 106 outputs the coded transmission data to modulation section 107 and also keeps the coded transmission data at the initial transmission. Data transmission controlling section 106 keeps the coded transmission data for each destination terminal 200. In addition, data transmission controlling section 106 keeps the transmission data for one destination terminal 200 for each downlink component carrier on which the transmission data is transmitted. Thus, it is possible to perform not only retransmission control for overall data transmitted to destination terminal 200, but also retransmission control for data on each downlink component carrier.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource indicated by the downlink control information assignment resource received from control section 101 and outputs the resultant modulation signals to IFFT section 109. Mapping section 108 herein maps the control information (DCI) received from modulation section 104 to one of a PDCCH and R-PDCCH.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

The control information and transmission data mapped to a plurality of subcarriers in a plurality of downlink component carriers in mapping section 108 is transformed into time-domain signals from frequency-domain signals in IFFT section 109, and CP adding section 110 adds a CP to the time-domain signals to form OFDM signals. The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signals or reference signals transmitted from terminal 200 and performs reception processing such as down-conversion, A/D conversion and/or the like on the uplink response signals or reference signals.

CP removing section 113 removes the CP added to the uplink response signals or reference signals from the uplink response signals or reference signals that have undergone the reception processing.

PUCCH extracting section 114 extracts, from the PUCCH signals included in the received signals, the signals in the PUCCH region corresponding to the bundled ACK/NACK resource previously notified to terminal 200. The bundled ACK/NACK resource herein refers to a resource used for transmission of the bundled ACK/NACK signals and adopting the DFT-S-OFDM format structure. To put it more specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

In addition, PUCCH extracting section 114 extracts, from the PUCCH signals included in the received signals, a plurality of PUCCH regions corresponding to an A/N resource associated with a CCE that has been occupied by the PDCCH used for transmission of the downlink assignment control information (DCI), and corresponding to a plurality of A/N resources previously notified to terminal 200. The A/N resource herein refers to the resource to be used for transmission of an A/N. To put it more specifically, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). In the extraction processing, PUCCH extracting section 114 selects the resource used for transmission of the response signals (i.e., resource on which the signals from terminal 200 are assigned), from a PUCCH resource associated with a CCE and a specific PUCCH resource previously notified to terminal 200, according to whether the control information is mapped to the PDCCH or R-PDCCH in mapping section 108, and extracts the response signals using the selected resource. PUCCH extracting section 114 outputs both of the extracted data part and reference signal part to despreading section 115-2. In this manner, the response signals are received on the resource selected from the PUCCH resource associated with the CCE and the specific PUCCH resource previously notified to terminal 200.

Sequence controlling section 116 generates a base sequence that may be used for spreading each of the A/N reported from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence control section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

To put it more specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

To put it more specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information received from bundled A/N determining section 121 and the information received from A/N determining section 118 and generates retransmission control signals based on the result of determination. To put it more specifically, when determining that downlink data transmitted on a certain downlink component carrier needs to be retransmitted, retransmission control signal generating section 122 generates retransmission control signals indicating a retransmission command for the downlink data and outputs the retransmission control signals to data transmission controlling section 106. In addition, when determining that the downlink data transmitted on a certain downlink component carrier does not need to be retransmitted, retransmission control signal generating section 122 generates retransmission control signals indicating not to retransmit the downlink data transmitted on the downlink component carrier and outputs the retransmission control signals to data transmission controlling section 106.

It should be noted that, the retransmission control in A/N determining section 118, bundled A/N determining section 121 and retransmission control signal generating section 122 will be described in detail, hereinafter.

(Configuration of Terminal)

Figure 12:
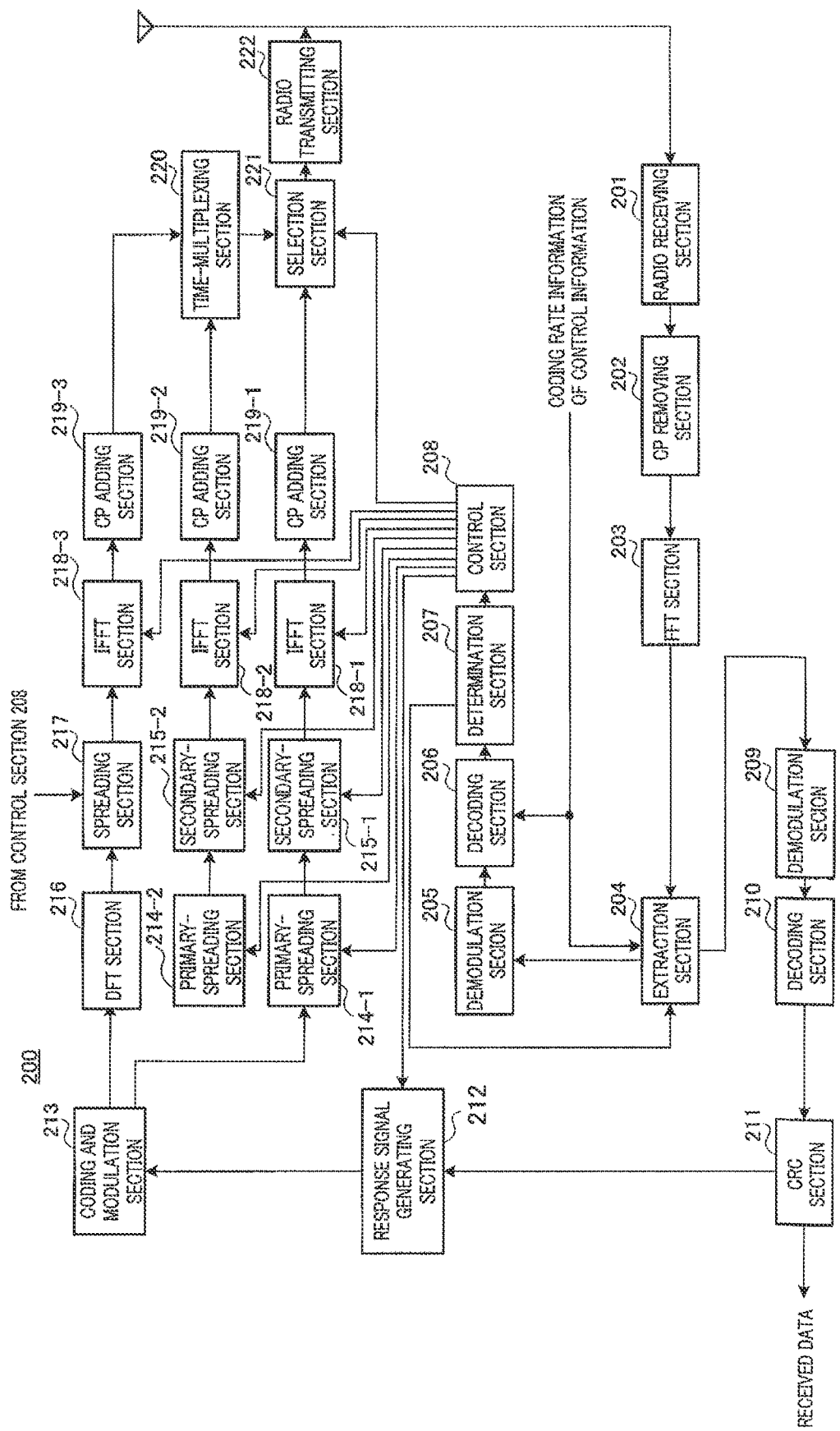
FIG. 12 is a block diagram illustrating a configuration of the terminal according to Embodiment 1 of the claimed invention.

FIG. 12 is a block diagram illustrating a configuration of terminal 200 according to Embodiment 1. In FIG. 12, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, OFDM signals transmitted from base station 100 and performs reception processing such as down-conversion, A/D conversion and/or the like on the received OFDM signals. It should be noted that, the received OFDM signals include PDSCH signals assigned to a resource in a PDSCH (i.e., downlink data), R-PDCCH signals assigned to a resource in an R-PDCCH or PDCCH signals assigned to a resource in a PDCCH. Hereinafter, the R-PDCCH signals and PDCCH signals may be referred to as "PDCCH signals" or "downlink control channel signals" simply without any distinction between R-PDCCH signals and PDCCH signals.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH signals or R-PDCCH signals) in accordance with coding rate information to be received. To put it more specifically, the number of CCEs (or R-CCEs) forming a downlink control information assignment resource varies depending on the coding rate. Thus, extraction section 204 uses the number of CCEs that corresponds to the coding rate as units of extraction processing, and extracts downlink control channel signals. In addition, the downlink control channel signals are extracted for each downlink component carrier. The extracted downlink control channel signals are outputted to demodulation section 205.

Extraction section 204 extracts downlink data (i.e., downlink data channel signals (i.e., PDSCH signals)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to one of the PDCCH and R-PDCCH and receives the downlink data on the PDSCH.

Demodulation section 205 demodulates the downlink control channel signals received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200. Determination section 207 outputs information on the downlink data assignment resource intended for terminal 200, which is included in the control information intended for terminal 200, to extraction section 204.

In addition, when detecting the control information (i.e., downlink assignment control information) intended for terminal 200, determination section 207 informs control section 208 that ACK/NACK signals will be generated (or are present). Moreover, when detecting the control information intended for terminal 200 from PDCCH signals, determination section 207 outputs information on a CCE that has been occupied by the PDCCH to control section 208.

Control section 208 identifies the A/N resource associated with the CCE on the basis of the information on the CCE received from determination section 207. Control section 208 outputs, to primary-spreading section 214-1, a base sequence and a cyclic shift value corresponding to the A/N resource associated with the CCE or the A/N resource previously notified by base station 100, and also outputs a Walsh sequence and a DFT sequence corresponding to the A/N resource to secondary-spreading section 215-1. In addition, control section 208 outputs the frequency resource information on the A/N resource to IFFT section 218-1.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously notified by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222.

During this process, control section 208 controls the transmission of the response signals by selecting the resource used for transmission of the response signals, from the PUCCH resource associated with the CCE and the specific PUCCH resource previously notified by base station 100, according to whether the downlink assignment control information (DCI) is mapped to the PDCCH or R-PDCCH. Control section 208 instructs response signal generating section 212 to generate the bundled ACK/NACK signals or the ACK/NACK signals in accordance with the selected resource. The method of determining the A/N resource as well as the method of controlling the bundled ACK/NACK resource in control section 208 will be described in detail, hereinafter.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates response signals on the basis of the reception condition of downlink data (i.e., result of error detection on downlink data) on each downlink component carrier received from CRC section 211.

To put it more specifically, when instructed to generate the bundled ACK/NACK signals from control section 208, response signal generating section 212 generates the bundled ACK/NACK signals including the results of error detection for the respective component carriers as individual pieces of data. Meanwhile, when instructed to generate ACK/NACK signals from control section 208, response signal generating section 212 generates ACK/NACK signals of one symbol. Response signal generating section 212 outputs the generated response signals to coding and modulation section 213.

Upon reception of the bundled ACK/NACK signals, coding and modulation section 213 encodes and modulates the received bundled ACK/NACK signals to generate the modulation signals of 12 symbols and outputs the modulation signals to DFT section 216. In addition, upon reception of the ACK/NACK signals of one symbol, coding and modulation section 213 modulates the ACK/NACK signals and outputs the modulation signals to primary-spreading section 214-1.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

Primary-spreading sections 214-1 and 214-2 corresponding to the A/N resource and the reference signal resource of bundled ACK/NACK resource spread ACK/NACK signals or reference signals using a base sequence corresponding to the resource in accordance with an instruction from control section 208 and outputs the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

IFFT sections 218-1, 218-2 and 218-3 perform IFFT processing on the received signals in association with the frequency positions where the signals are to be placed, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource and outputs the multiplexed signals to selection section 221.

Selection section 221 selects one of the bundled ACK/NACK resource received from time-multiplexing section 220 and the A/N resource received from CP adding section 219-1 and outputs the signals assigned to the selected resource to radio transmitting section 222.

Radio transmitting section 222 performs transmission processing such as D/A conversion, amplification and up-conversion and/or the like on the signals received from selection section 221 and transmits the resultant signals to base station 100 via an antenna.

(Operations of Base Station 100 and Terminal 200)

A description will be provided regarding operations of base station 100 and terminal 200 each configured in the manner described above.

In the following description, an assumption is made that whether to use only a PDCCH for transmission of downlink assignment control information or to use a PDCCH in combination with an R-PDCCH is already configured for each of a plurality of terminals 200 and notified to each terminal 200 as the result of configuration. However, even when configuring terminal 200 to use an R-PDCCH, base station 100 selectively uses a PDCCH and R-PDCCH depending on circumstances. For example, when there are only few terminals 200 to which control information is to be transmitted in a certain subframe, base station 100 transmits control information to all terminals 200 (including a terminal configured to use an R-PDCCH) using a PDCCH. Meanwhile, when there are many terminals 200 to which control information is to be transmitted in a certain subframe, for example, base station 100 transmits control information to some of terminals 200 (i.e., terminals 200 configured to use an R-PDCCH) using an R-PDCCH.

Four examples of how A/N resources used for transmission of response signals are controlled (hereinafter, referred to as control examples 1 to 4) will be described, hereinafter.

(Control Example 1: No Carrier Aggregation)

Base station 100 previously and explicitly notifies one specific A/N resource to terminal 200 using RRC signaling and/or the like (explicit signaling), for example, together with the result of configuration of a downlink control channel, when configuring an R-PDCCH for terminal 200 as a downlink control channel used for transmission of downlink assignment control information (i.e., DCI). For example, base station 100 explicitly notifies a specific PUCCH resource in PUCCH region 2 (PUCCH 2) as the A/N resource to terminal 200 configured to use an R-PDCCH in FIGS. 13A and 13B.

Figures 13A, 13B:
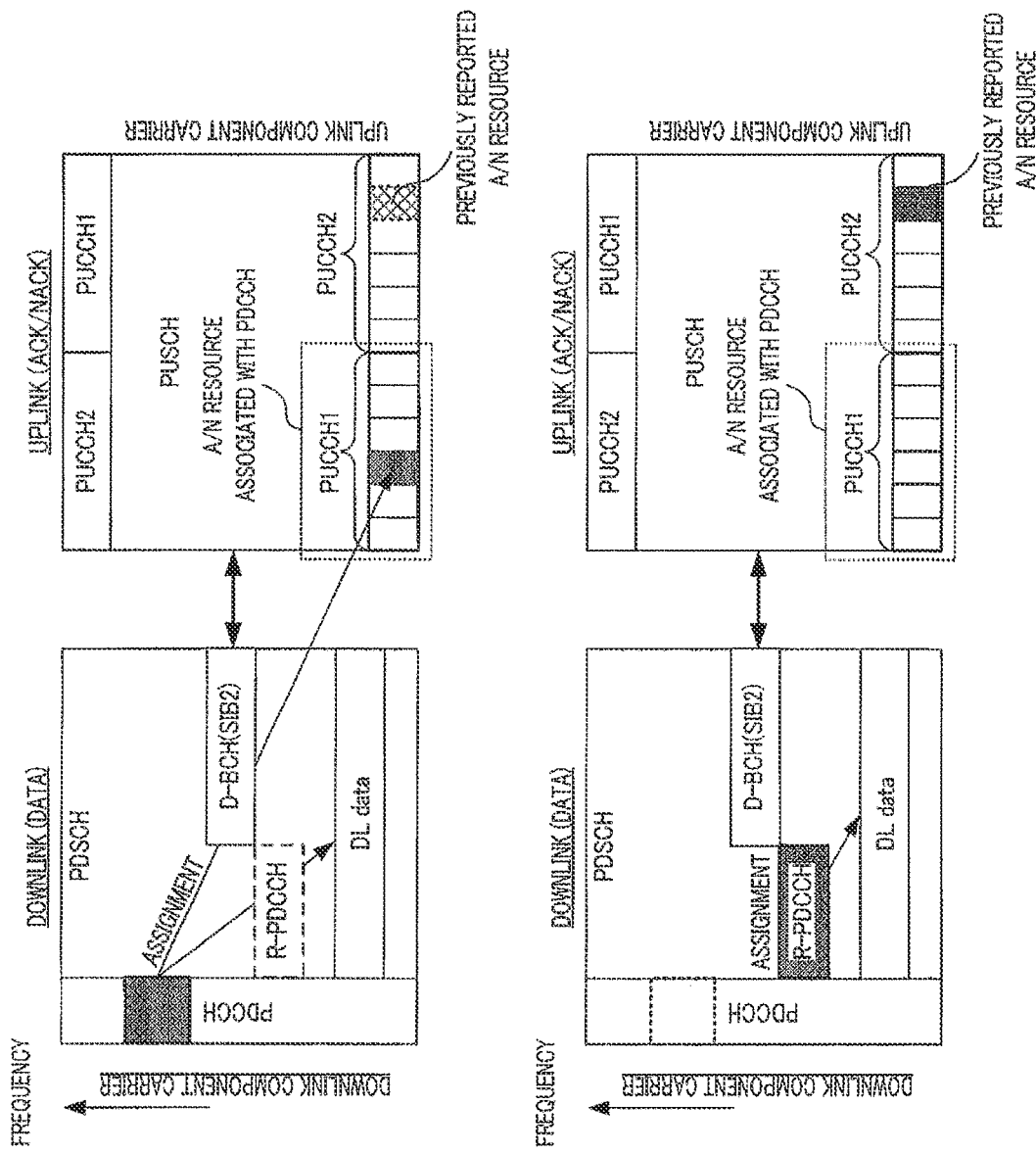
FIGS. 13A and 13B illustrate control example 1 for A/N resources, according to Embodiment 1 of the claimed invention.

In FIGS. 13A and 13B, CCEs included in the PDCCH are associated in a one-to-one correspondence with PUCCH resources (i.e., A/N resources) in PUCCH region 1 (PUCCH 1) (implicit signaling).

Base station 100 maps the downlink assignment control information (i.e., DCI) to the PDCCH or R-PDCCH and transmits the downlink assignment control information (i.e., DCI) to terminal 200.

When configured to use a PDDCH and R-PDCCH by base station 100, terminal 200 detects the downlink assignment control information (i.e., DCI) intended for terminal 200, by performing blind-decoding (monitoring) in both of the PDCCH region and R-PDCCH region. Terminal 200 (i.e., extraction section 204) extracts downlink data (DL data) on the basis of the downlink assignment control information mapped to one of the PDCCH and R-PDCCH.

Subsequently, terminal 200 detects the presence or absence of an error in receiving the downlink data (DL data) assigned using the downlink assignment control information (i.e., DCI) intended for terminal 200 and transmits ACK/NACK signals using a PUCCH on an uplink component carrier on the basis of the result of error detection. During this processing, terminal 200 selects the A/N resource used for transmission of the ACK/NACK signals, from the PUCCH resource associated with the CCE and the specific A/N resource previously notified by base station 100, according to whether the downlink assignment control information (i.e., DCI) intended for terminal 200 is mapped to the PDCCH or R-PDCCH (i.e., according to whether the downlink assignment control information is received on the PDCCH or R-PDCCH).

To put it more specifically, upon reception of the downlink assignment control information (i.e., DCI) intended for terminal 200 on the PDCCH, terminal 200 (i.e., control section 208) selects the PUCCH resource associated in a one-to-one correspondence with the CCE to which the downlink assignment control information is mapped (i.e., CCE on which the PDCCH has been transmitted or CCE that has been occupied by the PDCCH used for transmission of the downlink assignment control information) (i.e., PUCCH resource in PUCCH 1), as the A/N resource used for transmission of ACK/NACK signals as illustrated in FIG. 13A. Terminal 200 transmits the ACK/NACK signals using the selected A/N resource.

On the other hand, upon reception of the downlink assignment control information (i.e., DCI) intended for terminal 200 on the R-PDCCH, terminal 200 (i.e., control section 208) selects the specific A/N resource previously and explicitly notified by base station 100 (i.e., PUCCH resource in PUCCH 2, as the A/N resource used for transmission of ACK/NACK signals as illustrated in FIG. 13B. Terminal 200 transmits the ACK/NACK signals using the selected A/N resource.

In addition, base station 100 selects the PUCCH resource used for transmission of the ACK/NACK signals from terminal 200 in accordance with the downlink control channel (i.e., PDCCH or R-PDCCH) to which the downlink assignment control information intended for each terminal 200 is mapped and extracts the signals included in the selected PUCCH resource.

As described above, base station 100 explicitly notifies the A/N resource to terminal 200. Thus, base station 100 does not have to associate the PUCCH resources with all the R-CCEs in a one-to-one correspondence unlike method 1 described above.

Accordingly, it is possible to minimize an increase in the number of A/N resources to be secured for transmission of ACK/NACK signals for the downlink data assigned using the downlink assignment control information transmitted on an R-PDCCH, i.e., to minimize an increase in the overhead of PUCCH resources.

Meanwhile, although base station 100 previously and explicitly notifies one A/N resource to terminal 200, it is not true that terminal 200 always uses the A/N resource for transmission of ACK/NACK signals. To put it more specifically, upon reception of downlink assignment control information on a PDCCH, terminal 200 preferentially uses the PUCCH resource associated with the CCE that has been occupied by the PDCCH used for transmission of the downlink assignment control information.

Thus, even if base station 100 explicitly notifies the same A/N resource (i.e., A/N resource previously notified as illustrated in FIGS. 13A and 13B) to a plurality of terminals 200, the limitation on a scheduler of base station 100 is only "not to assign downlink assignment control information for the plurality of terminals 200 to which the same A/N resource has been notified, to the R-PDCCH region in the same subframe." For example, base station 100 may transmit, using an R-PDCCH, only the downlink assignment control information intended for one terminal 200 among the plurality of terminals 200 to which the same A/N resource has been notified, and transmit the downlink assignment control information intended for the other remaining terminals 200 using a PDCCH. Accordingly, only one terminal 200 transmits the response signals using the A/N resource that has been notified to the plurality of terminals 200. To put it differently, base station 100 can control ACK/NACK signals from terminals 200 so as to avoid a collision between ACK/NACK signals from terminals 200 while allowing a plurality of terminals 200 to share a single A/N resource through the extremely simple scheduling described above.

Accordingly, base station 100 can configure a common A/N resource for terminals 200, thereby eliminating the need for configuring individual A/N resources for respective terminals 200 unlike method 2 described above, and thus minimizing an increase in the overhead of PUCCH resources.

Accordingly, in control example 1, a plurality of terminals 200 can share the same A/N resource while preferentially using the PUCCH resource previously associated with the CCE that has been occupied by the PDCCH. Thus, the use efficiency of PUCCH resources can be improved with almost no additional limitations on a scheduler of base station 100. In other words, terminal 200 can efficiently transmit ACK/NACK signals even when receiving downlink assignment control information on an R-PDCCH.

(Control Example 2: with Carrier Aggregation and Channel Selection)

Figure 14A:
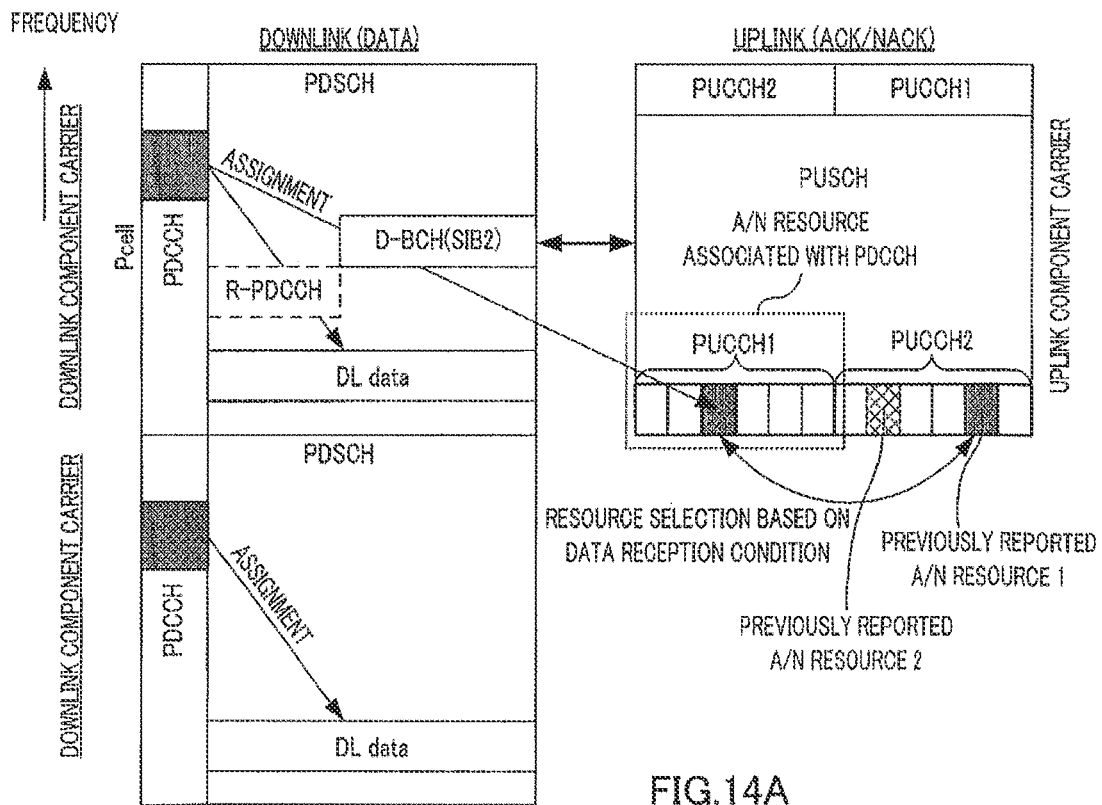
FIG. 14A illustrates control example 2 for transmission of response signals, according to Embodiment 1 of the claimed invention.
Figure 14B:
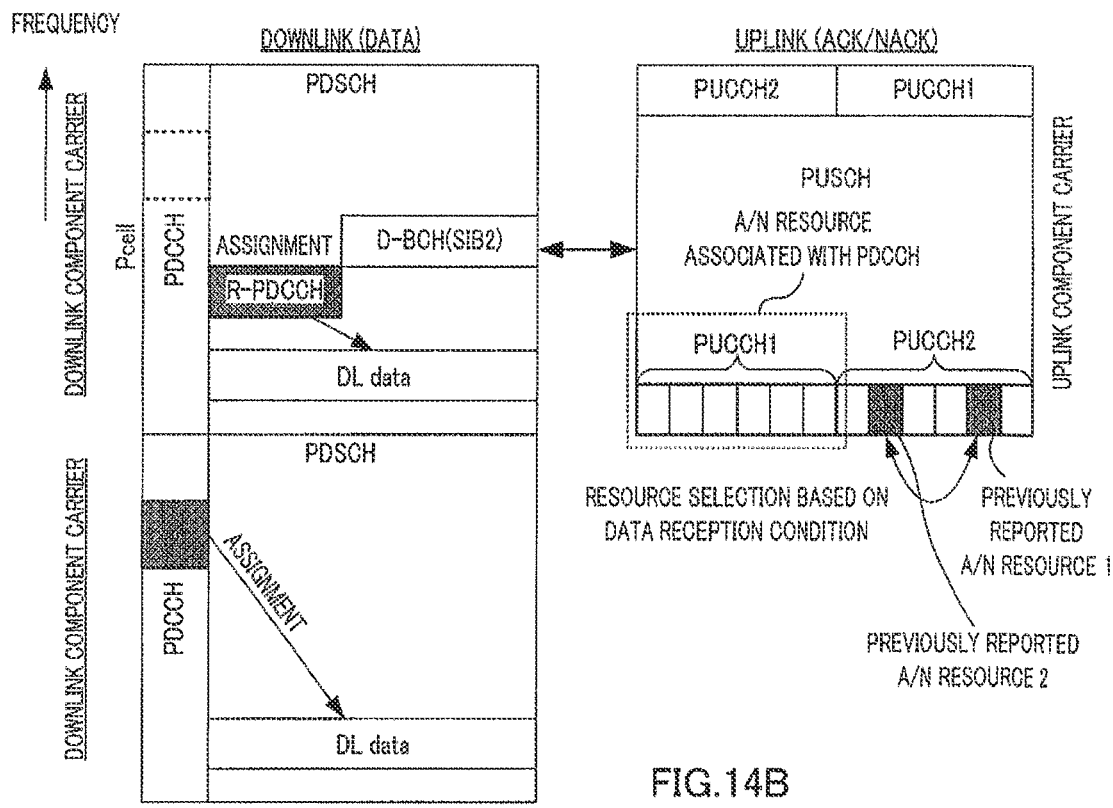
FIG. 14B illustrates control example 2 for transmission of response signals, according to Embodiment 1 of the claimed invention.

In control example 2, two downlink component carriers and one uplink component carrier are configured for terminals 200 as illustrated in FIGS. 14A and 14B. To put it more specifically, base station 100 and terminals 200 communicate with each other using two downlink component carriers and one uplink component carrier, i.e., using asymmetric carrier aggregation.

In addition, channel selection is employed as a method of transmitting response signals (i.e., ACK/NACK signals) in terminals 200. In FIGS. 14A and 14B, two results of error detection on pieces of downlink data transmitted using the two downlink component carriers, respectively (i.e., four combinations), need to be fed back. Accordingly, channel selection requires two A/N resources (i.e., PUCCH resources).

In addition, as illustrated in FIGS. 14A and 14B, one of the two downlink component carriers configured for terminal 200 is paired with one uplink component carrier to be used for transmission of response signals. The downlink component carrier paired with the uplink component carrier to be used for transmission of response signals is called a primary component carrier (PCC) or a primary cell (Pcell). For example, PCC (or Pcell) is the downlink component carrier used to transmit broadcast information about the uplink component carrier on which response signals to be transmitted (e.g., system information block type 2 (SIB 2)). In addition, the CCEs included in the PDCCH region in PCC (or Pcell) are associated with PUCCH resources in the uplink component carrier (i.e., PUCCH resources in PUCCH 1 in FIGS. 14A and 14B) in a one-to-one correspondence (implicit signaling).

In this case, when previously configuring, for terminal 200, an R-PDCCH as a downlink control channel used for transmission of downlink assignment control information (i.e., DCI) in Pcell, base station 100 explicitly notifies two specific A/N resources together with the result of configuration of the downlink control channel, for example, using RRC signaling (explicit signaling). In FIGS. 14A and 14B, base station 100 explicitly notifies two specific PUCCH resources in PUCCH region 2 (PUCCH 2) as A/N resource 1 and A/N resource 2 to terminals 200 for which the R-PDCCH is configured, for example.

Base station 100 maps downlink assignment control information (i.e., DCI) to the PDCCH or R-PDCCH in Pcell and transmits the downlink assignment control information (i.e., DCI) to terminals 200. In addition, base station 100 maps downlink assignment control information (i.e., DCI) to the PDCCH on the downlink component carrier other than Pcell and transmits the downlink assignment control information (i.e., DCI) to terminals 200.

Each terminal 200 detects the downlink assignment control information (i.e., DCI) intended for terminal 200 by performing blind-decoding (i.e., monitoring) in both of the PDCCH region and R-PDCCH region at least in Pcell. Terminal 200 (i.e., extraction section 204) extracts downlink data (DL data) on the basis of the downlink assignment control information mapped to one of the PDCCH and R-PDCCH. Accordingly, terminal 200 receives downlink data on each of the plurality of downlink component carriers.

Subsequently, terminal 200 (i.e., CRC section 211) detects the presence or absence of an error in receiving the downlink data (DL data) assigned using the downlink assignment control information (i.e., DCI) intended for terminal 200 in each of the downlink component carriers. Moreover, response signal generating section 212 generates ACK/NACK signals in accordance with the pattern of the results of error detection (presence or absence of reception errors) on the pieces of downlink data in the respective downlink component carriers.

Terminal 200 transmits the ACK/NACK signals using the PUCCH on the uplink component carrier. For this transmission, terminal 200 selects the A/N resource used for transmission of the ACK/NACK signals, from the PUCCH resource associated with the CCE and the specific A/N resources previously notified by base station 100, according to whether the downlink assignment control information (i.e., DCI) intended for terminal 200 is mapped to the PDCCH or R-PDCCH in Pcell.

To put it more specifically, as illustrated in FIG. 14A, upon reception of the downlink assignment control information intended for terminal 200 on the PDCCH in Pcell of the two downlink component carriers, terminal 200 (i.e., control section 208) performs the channel selection operation using two A/N resources including the PUCCH resource associated in a one-to-one correspondence with the CCE (i.e., PUCCH resource in PUCCH 1) to which the downlink assignment control information is mapped (i.e., CCE used for transmission of the PDCCH) and A/N resource 1 previously and explicitly notified by base station 100. To put it differently, terminal 200 selects which phase point of which one of the two A/N resources is used to transmit the ACK/NACK signals on the basis of the reception conditions (pattern of the presence or absence of reception errors) of the pieces of downlink data received on the respective two downlink component carriers in FIG. 14A. Terminal 200 transmits the ACK/NACK signals using the selected A/N resource and phase point.

Meanwhile, as illustrated in FIG. 14B, upon reception of the downlink assignment control information intended for terminal 200 on the R-PDCCH in Pcell of the two downlink component carriers, terminal 200 (i.e., control section 208) performs the channel selection operation using the two A/N resources previously and explicitly notified by base station 100 (i.e., A/N resource 1 and A/N resource 2).

As described above, base station 100 explicitly notifies the A/N resources (e.g., A/N resources 1 and 2 in FIGS. 14A and 14B) to terminal 200, so that base station 100 does not have to associate the PUCCH resources to all the R-CCEs in a one-to-one correspondence unlike method 1 described above. Thus, it is possible to minimize an increase in the number of A/N resources to be secured for transmission of ACK/NACK signals for the downlink data assigned by the downlink assignment control information transmitted via an R-PDCCH, i.e., to minimize an increase in the overhead of PUCCH resources.

Moreover, when terminal 200 receives downlink assignment control information via the PDCCH in Pcell although A/N resources are previously and explicitly notified to terminal 200 by base station 100, terminal 200 preferentially uses the PUCCH resource associated with the CCE that has been occupied by the PDCCH in Pcell used for transmission of the downlink assignment control information as in the case of control example 1. Thus, base station 100 can control ACK/NACK signals from terminals 200 so as to avoid a collision between ACK/NACK signals from terminals 200 while allowing a plurality of terminals 200 to share A/N resources through the extremely simple scheduling as in the case of control example 1, thereby minimizing an increase in the overhead of PUCCH resources.

Thus, in control example 2, a plurality of terminals 200 can share the same A/N resources while preferentially using the PUCCH resource previously associated with the CCE that has been occupied by the PDCCH in Pcell. Thus, the use efficiency of PUCCH resources can be improved with almost no additional limitations on a scheduler of base station 100. To put it differently, even when terminal 200 receives downlink assignment control information on an R-PDCCH in a case where channel selection is applied, terminal 200 can efficiently transmit ACK/NACK signals.

In FIGS. 14A and 14B, the case where terminal 200 monitors the R-PDCCH region only in Pcell has been described. However, the operation of control example 2 described above can be also applied to a case where terminal 200 monitors an R-PDCCH region in a downlink component carrier other than Pcell, i.e., a case where an R-PDCCH is configured in a downlink component carrier other than Pcell.

Moreover, although the case where two downlink component carriers are configured for terminal 200 has been described in FIGS. 14A and 14B, the number of downlink component carriers configured for terminal 200 can be three or more. When the number of downlink component carriers configured for terminal 200 is three or more, the number of combinations of results of error detection on the respective downlink component carriers (i.e., patterns of the presence or absence of reception errors) increases, so that the number of resources required for channel selection (e.g., two resources when the number of downlink component carriers is two) increases as well. In this case, base station 100 may determine the number of A/N resources to be previously and explicitly notified to terminal 200 on the basis of the number of downlink component carriers configured for terminal 200.

In addition, although the case where base station 100 configures both of carrier aggregation and channel selection for terminal 200 has been described in control example 2, there may be a situation where base station 100 performs downlink data assignment without using carrier aggregation (i.e., non-carrier aggregation assignment) for terminal 200 depending on circumstances even when such a configuration is employed. When base station 100 performs downlink data assignment without using carrier aggregation for terminal 200 in a certain subframe, terminal 200 performs, in the subframe, the operation illustrated in FIG. 13. In this case, however, the A/N resource in FIG. 13 and the A/N resource 1 (or A/N resource 2) in FIG. 14 can be configured as the same resource. Accordingly, there is no need for base station 100 to report an additional A/N resource to terminal 200 even when base station 100 adaptively selects between communications using carrier aggregation and communications without using carrier aggregation. As a result, the overhead can be reduced.

(Control Example 3: With Carrier Aggregation and DFT-S-OFDM Format)

In control example 3, two downlink component carriers and one uplink component carrier are configured for terminals 200 as illustrated in FIGS. 15A to 15D.

In addition, the DFT-S-OFDM format is applied as a method of transmitting response signals in terminals 200.

Moreover, one of the two downlink component carriers configured for terminals 200 is Pcell (or PCC) and the CCEs included in the PDCCH region in Pcell are associated in a one-to-one correspondence with PUCCH resources in the uplink component carrier (i.e., PUCCH resources in PUCCH 1 in FIGS. 15A to 15D) (implicit signaling) as illustrated in FIGS. 15A to 15D.

In control example 3, when previously configuring an R-PDCCH as the downlink control channel used for transmission of downlink assignment control information (i.e., DCI) in Pcell, or configuring carrier aggregation for terminals 200, base station 100 explicitly notifies one bundled A/N resource (i.e., resource having the DFT-S-OFDM format (sometimes called a large ACK/NACK resource) together with the result of configuration, for example, using RRC signaling and/or the like (explicit signaling). For example, base station 100 explicitly notifies specific PUCCH resources in PUCCH region 2 (PUCCH 2) to terminals 200 as a bundled A/N resource in FIGS. 15A to 15D.

In addition, base station 100 maps downlink assignment control information (i.e., DCI) to the PDCCH or R-PDCCH in Pcell and transmits the downlink assignment control information (i.e., DCI) to terminals 200. Moreover, base station 100 maps downlink assignment control information (i.e., DCI) to the PDCCH in the downlink component carrier other than Pcell and transmits the downlink assignment control information (i.e., DCI) to terminals 200.

Each terminal 200 detects the downlink assignment control information (i.e., DCI) intended for terminal 200 by performing blind-decoding (i.e., monitoring) in both of the PDCCH region and R-PDCCH region at least in Pcell. Terminal 200 (i.e., extraction section 204) extracts downlink data (DL data) on the basis of the downlink assignment control information mapped to one of the PDCCH region and R-PDCCH. In this manner, terminal 200 receives the downlink assignment control information and downlink data for each downlink component carrier in at least one of the plurality of downlink component carriers.

Subsequently, terminal 200 (i.e., CRC section 211) detects the presence or absence of an error in receiving downlink data (DL data) assigned using the downlink assignment control information (i.e., DCI) intended for terminal 200 in each of the downlink component carriers. In addition, response signal generating section 212 generates response signals on the basis of the results of error detection on the pieces of downlink data on the respective downlink component carriers (i.e., presence or absence of errors), i.e., bundled ACK/NACK signals (i.e., response signals including the presence or absence of reception errors in the respective pieces of downlink data) or ACK/NACK signals. Terminal 200 transmits the response signals (i.e., ACK/NACK signals or bundled ACK/NACK signals) using a PUCCH in the uplink component carrier. For this transmission, terminal 200 selects the A/N resource used for transmission of the response signals, from the PUCCH resource associated with the CCE and the specific bundled A/N resource previously notified by base station 100, according to whether the downlink assignment control information (i.e., DCI) intended for terminal 200 is mapped to the PDCCH or R-PDCCH in Pcell.

Figure 15A:
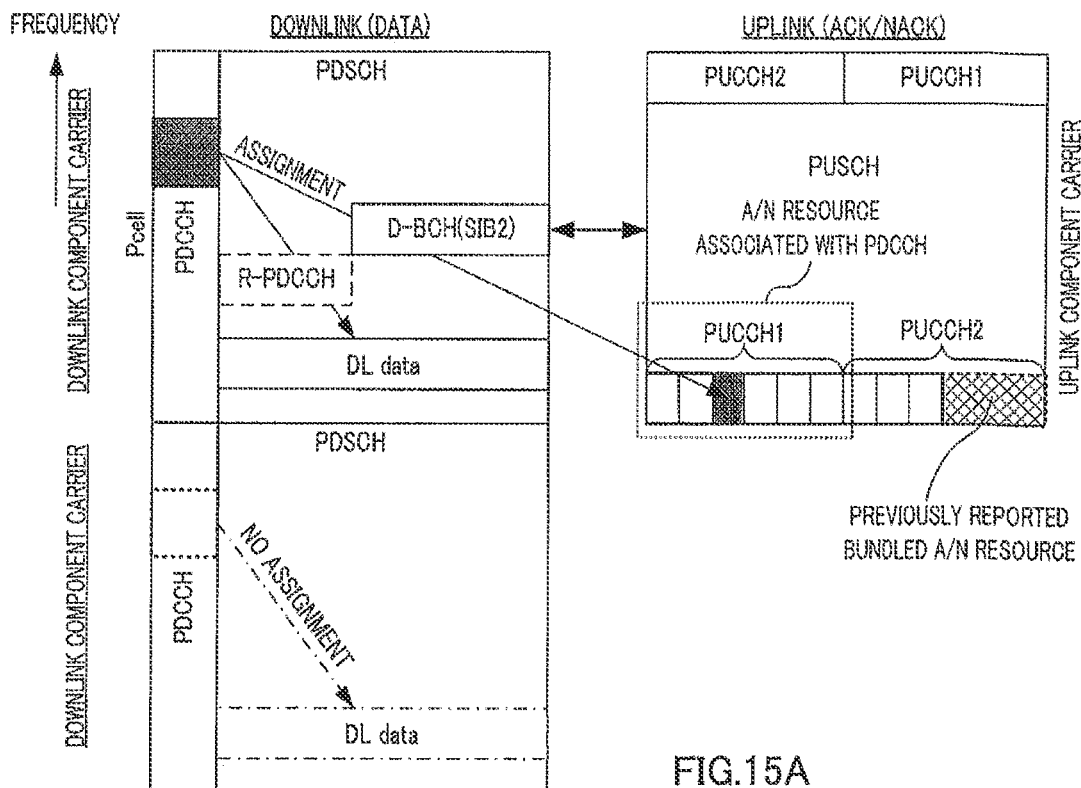
FIG. 15A illustrates control example 3 for transmission of response signals, according to Embodiment 1 of the claimed invention.

To put it more specifically, as illustrated in FIG. 15A, when receiving the downlink assignment control information intended for terminal 200 on the PDCCH in Pcell but receiving no downlink assignment control information on the other downlink component carrier (i.e., secondary component carrier (SCC)) or secondary cell (Scell)) among the plurality of downlink component carriers, terminal 200 selects the PUCCH resource (PUCCH resource in PUCCH 1) associated in a one-to-one correspondence with the CCE to which the downlink assignment control information is mapped (i.e., CCE used for transmission of the PDCCH). Terminal 200 transmits the response signals (i.e., ACK/NACK signals) for the downlink data (DL data) received in Pcell using the selected PUCCH resource.

Figure 15B:
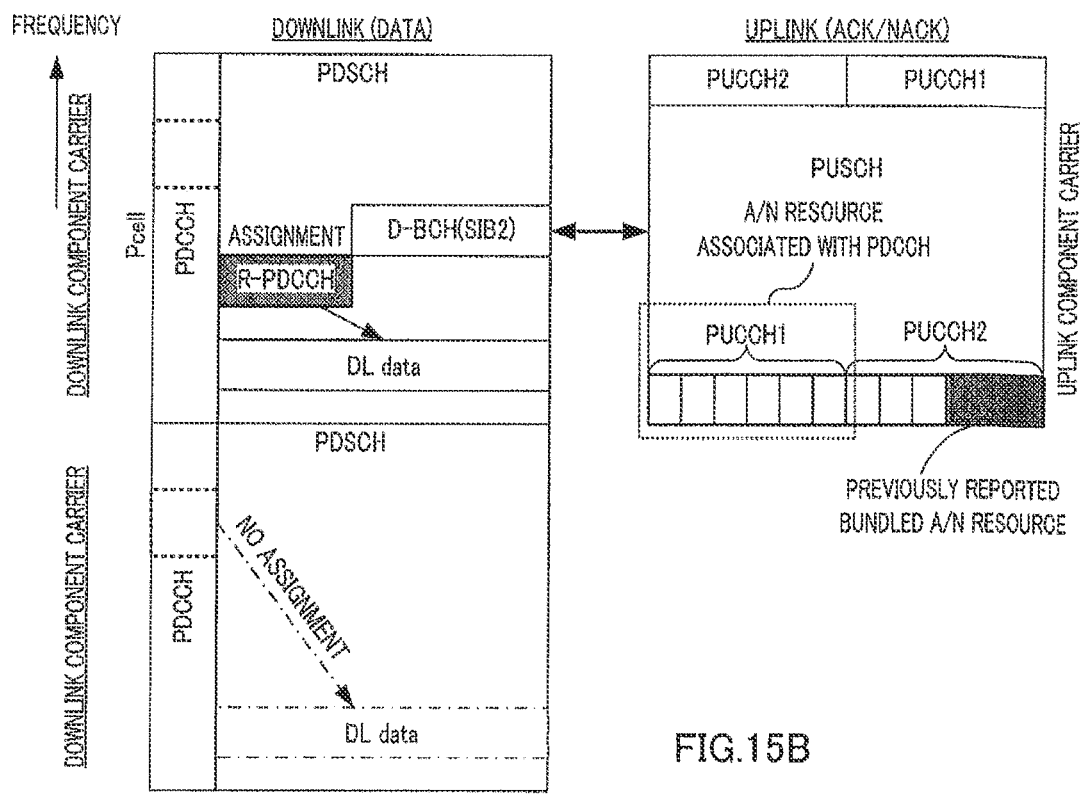
FIG. 15B illustrates control example 3 for transmission of response signals, according to Embodiment 1 of the claimed invention.

In addition, when receiving the downlink assignment control information intended for terminal 200 on the R-PDCCH in Pcell but receiving no downlink assignment control information on the other downlink component carrier, terminal 200 (i.e., control section 208) selects the bundled A/N resource previously and explicitly notified by base station 100 as illustrated in FIG. 15B. Terminal 200 transmits the response signals (i.e., ACK/NACK signals) for the downlink data (DL data) received in Pcell using the selected bundled A/N resource.

Figure 15C:
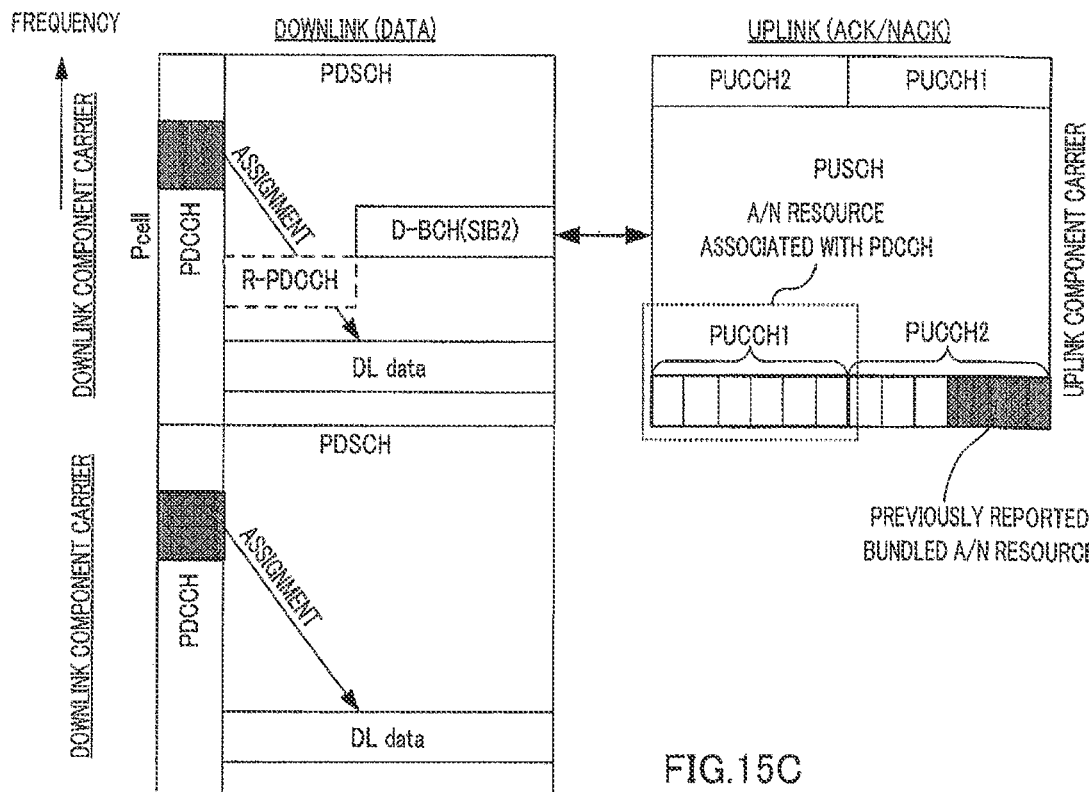
FIG. 15C illustrates control example 3 for transmission of response signals, according to Embodiment 1 of the claimed invention.

In addition, when receiving the downlink assignment control information intended for terminal 200 on the PDCCH in Pcell and also receiving the downlink assignment control information on the other downlink component carrier, terminal 200 (i.e., control section 208) selects the bundled A/N resource previously and explicitly notified by base station 100 as illustrated in FIG. 15C. Terminal 200 transmits the bundled A/N signals obtained by jointly encoding (i.e., joint coding) the response signals for the pieces of downlink data (DL data) received respectively in Pcell and in the other downlink component carrier using the selected bundled A/N resources.

Figure 15D:
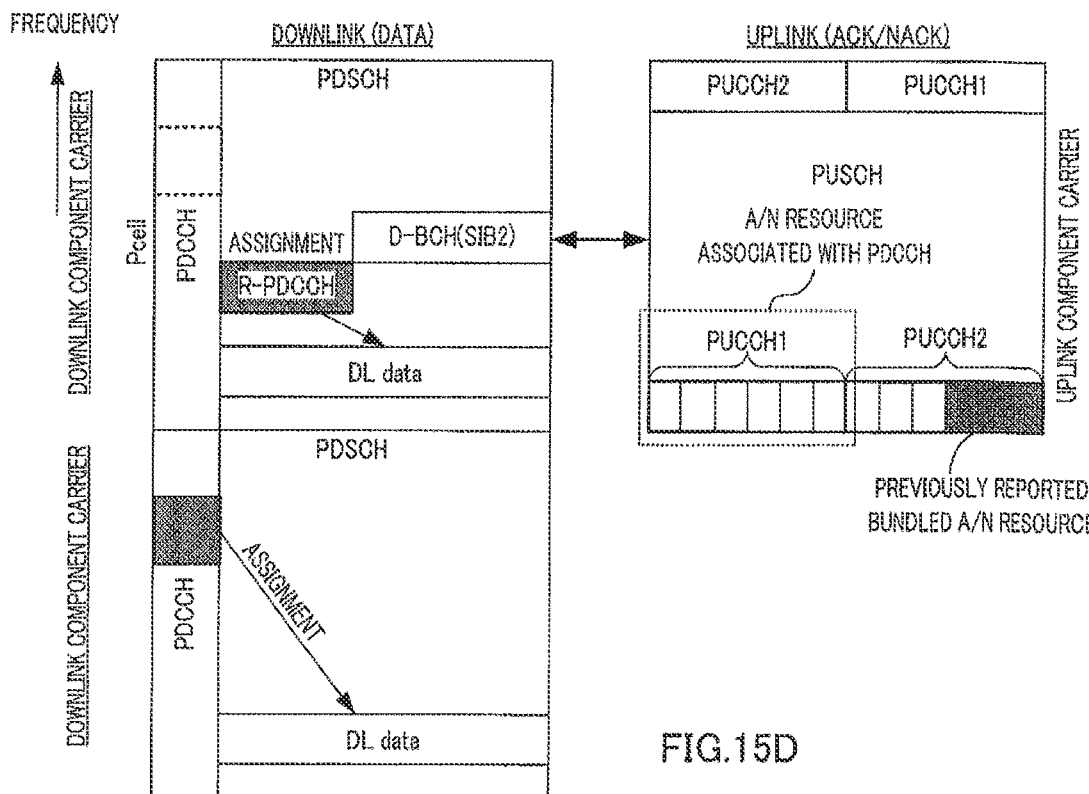
FIG. 15D illustrates control example 3 for transmission of response signals, according to Embodiment 1 of the claimed invention.

In addition, when receiving the downlink assignment control information intended for terminal 200 on the R-PDCCH in Pcell and also receiving the downlink assignment control information on the other downlink component carrier, terminal 200 (i.e., control section 208) selects the bundled A/N resource previously and explicitly notified by base station 100 as illustrated in FIG. 15D. Terminal 200 transmits the bundled A/N signals obtained by jointly encoding (i.e., joint coding) the response signals for the pieces of downlink data (DL data) received respectively in Pcell and in the other downlink component carrier using the selected bundled A/N resource.

In other words, when receiving downlink assignment control information in Pcell and also receiving downlink assignment control information in the other downlink component carrier among the plurality of downlink component carriers (i.e., carrier aggregation assignment in FIGS. 15C and 15D), terminal 200 uses the bundled A/N resource previously and explicitly notified by base station 100, regardless of the downlink control channel used for transmission of the downlink assignment control information in Pcell (i.e., PDCCH and R-PDCCH).

As described above, base station 100 previously and explicitly notifies a bundled A/N resource to terminal 200, so that base station 100 does not have to associate the PUCCH resources with all the R-CCEs in a one-to-one correspondence unlike method 1 described above. Thus, it is possible to minimize an increase in the number of A/N resources to be secured for transmission of ACK/NACK signals for the downlink data assigned by the downlink assignment control information transmitted on an R-PDCCH, i.e., to minimize an increase in the overhead of PUCCH resources.

Moreover, as in control example 1, although base station 100 previously and explicitly notifies one bundled A/N resource to terminal 200, it is not true that terminal 200 always uses the bundled A/N resource for transmission of ACK/NACK signals.

To put it more specifically, when receiving downlink assignment control information on the PDCCH in Pcell but receiving no downlink assignment control information in the other downlink component carrier, terminal 200 preferentially uses the PUCCH resource associated with the CCE that has been occupied by the PDCCH used for transmission of the downlink assignment control information in Pcell. In other words, the bundled A/N resource (i.e., resource having the DFT-S-OFDM format) is used in terminal 200 only when necessary. Thus, a plurality of terminals 200 can share the same bundled A/N resource. Thus, base station 100 can control response signals from terminals 200 so as to avoid a collision between the response signals from terminals 200 while allowing a plurality of terminals 200 to share the same bundled A/N resource through the extremely simple scheduling as in the case of control example 1, thereby minimizing an increase in the overhead of PUCCH resources.

Accordingly, in control example 3, a plurality of terminals 200 can share the same bundled A/N resource while preferentially using the PUCCH resource previously associated with the CCE that has been occupied by the PDCCH in Pcell. Thus, the use efficiency of PUCCH resources can be improved with almost no additional limitations on a scheduler of base station 100. To put it differently, terminal 200 can efficiently transmit response signals even when receiving downlink assignment control information on an R-PDCCH in a case where the DFT-S-OFDM format is adopted.

In FIGS. 15A to 15D, the case where terminal 200 monitors an R-PDCCH region only in Pcell has been described. However, the operation of control example 3 can be applied to a case where terminal 200 monitors an R-PDCCH in a downlink component carrier other than Pcell, i.e., a case where an R-PDCCH is configured in a downlink component carrier other than Pcell.

(Control Example 4: With Carrier Aggregation and DFT-S-OFDM Format)

In control example 4, as in control example 3, two downlink component carriers and one uplink component carrier are configured for terminals 200 as illustrated in FIGS. 16A to 16D.

In addition, the DFT-S-OFDM format is applied as a method of transmitting response signals in terminals 200.

Moreover, one of the two downlink component carriers configured for terminals 200 is Pcell (or PCC) and the CCEs included in the PDCCH region in Pcell are associated in a one-to-one correspondence with PUCCH resources in the uplink component carrier (i.e., PUCCH resources in PUCCH 1 in FIGS. 16A to 16D) (implicit signaling) as illustrated in FIGS. 16A to 16D.

In control example 4, when previously configuring an R-PDCCH as the downlink control channel used for transmission of downlink assignment control information (i.e., DCI) in Pcell, or configuring carrier aggregation for terminals 200, base station 100 previously and explicitly notifies two specific PUCCH resources including one bundled A/N resource and one A/N resource, together with the result of configuration, for example, using RRC signaling and/or the like (explicit signaling). For example, base station 100 previously and explicitly notifies the specific PUCCH resources in PUCCH region 2 (PUCCH 2) to terminals 200 as a bundled A/N resource and an A/N resource in FIGS. 16A to 16D. It should be noted that the A/N resource is not limited to the specific PUCCH resource in PUCCH region 2

(PUCCH 2), and a specific PUCCH resource in PUCCH region 1 (not illustrated) may be used as the A/N resource.

In addition, base station 100 maps downlink assignment control information (i.e., DCI) to the PDCCH or R-PDCCH in Pcell and transmits the downlink assignment control information (i.e., DCI) to terminals 200. Moreover, base station 100 maps downlink assignment control information (i.e., DCI) to the PDCCH in a downlink component carrier other than Pcell and transmits the downlink assignment control information (i.e., DCI) to terminals 200.

Each terminal 200 detects the downlink assignment control information (i.e., DCI) intended for terminal 200 by performing blind-decoding (monitoring) on the PDCCH region and R-PDCCH region at least in Pcell. Terminal 200 (i.e., extraction section 204) extracts downlink data (DL data) on the basis of the downlink assignment control information mapped to one of the PDCCH and R-PDCCH. In this manner, terminal 200 receives the downlink assignment control information and downlink data for each of the downlink component carriers in at least one of the plurality of downlink component carriers.

Subsequently, terminal 200 (i.e., CRC section 211) detects the presence or absence of an error in receiving the downlink data (DL data) assigned using the downlink assignment control information (i.e., DCI) intended for terminal 200 in each of the downlink component carriers. In addition, response signal generating section 212 generates bundled ACK/NACK signals or ACK/NACK signals on the basis of the result of error detection on the downlink data on each of the downlink component carriers (i.e., presence or absence of a reception error). Terminal 200 transmits the response signals (i.e., ACK/NACK signals or bundled ACK/NACK signals) using a PUCCH in the uplink component carrier. For this transmission, terminal 200 selects the A/N resource used for transmission of the response signals according to whether the downlink assignment control information (i.e., DCI) intended for terminal 200 is mapped to the PDCCH or R-PDCCH in Pcell and also whether or not downlink assignment control information is assigned to a downlink control channel of each of the downlink component carriers.

Figure 16A:
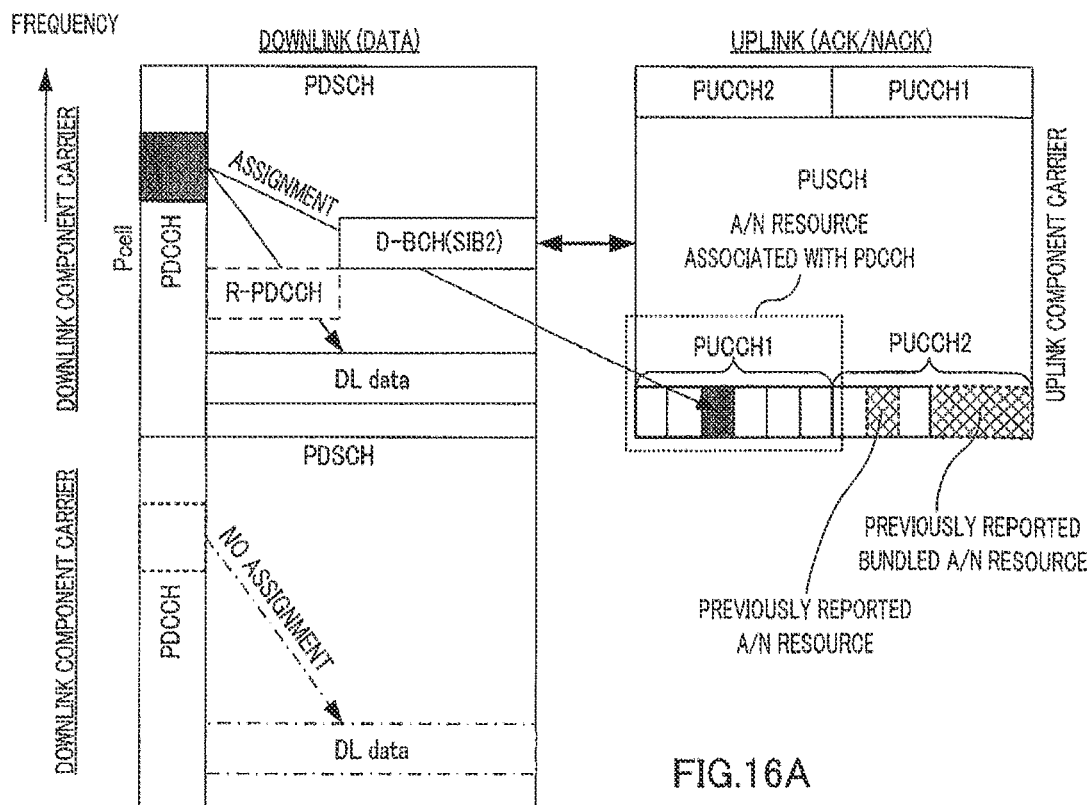
FIG. 16A illustrates control example 4 for transmission of response signals, according to Embodiment 1 of the claimed invention.

To put it more specifically, as illustrated in FIG. 16A, when receiving the downlink assignment control information intended for terminal 200 on the PDCCH in Pcell but receiving no downlink assignment control information in the other downlink component carrier (e.g., Scell or SCC), terminal 200 selects the PUCCH resource associated in a one-to-one correspondence with the CCE (i.e., PUCCH resource in PUCCH 1) to which the downlink assignment control information is mapped (i.e., CCE used for transmission of the PDCCH). Terminal 200 transmits the response signals (i.e., ACK/NACK signals) for the downlink data (DL data) received in Pcell using the selected PUCCH resource.

Figure 16B:
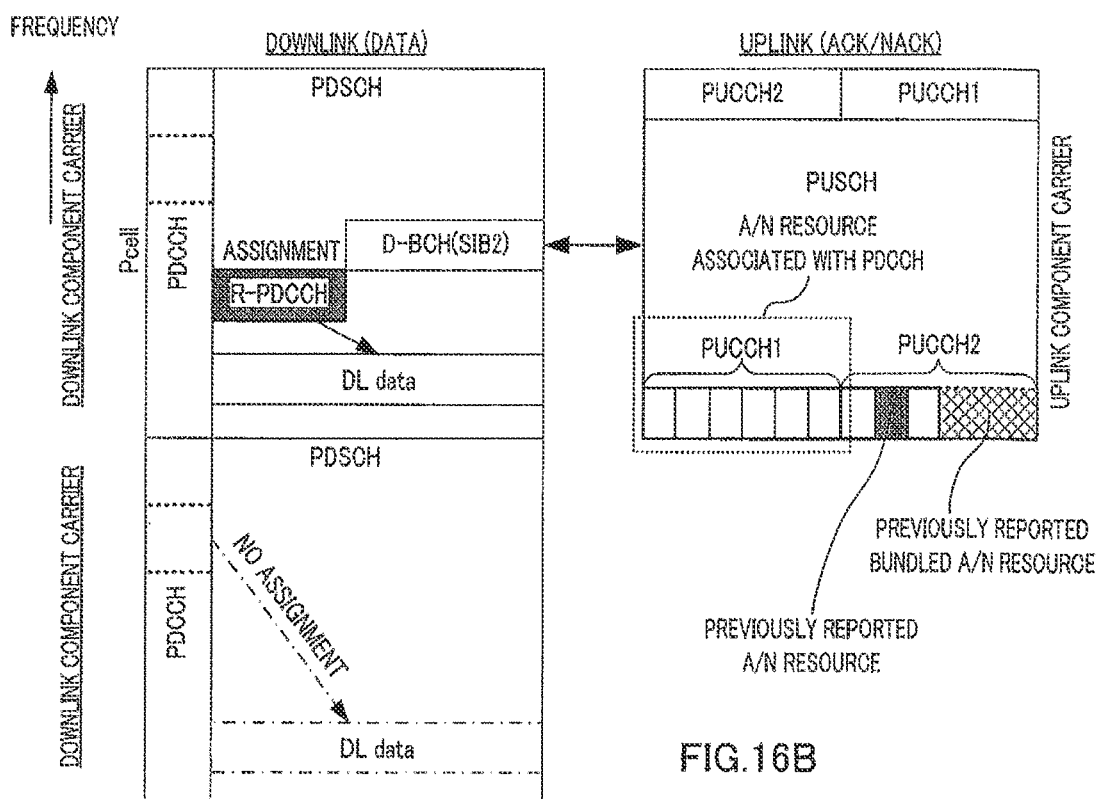
FIG. 16B illustrates control example 4 for transmission of response signals, according to Embodiment 1 of the claimed invention.

In addition, when receiving the downlink assignment control information intended for terminal 200 on the R-PDCCH in Pcell but receiving no downlink assignment control information in the other downlink component carrier, terminal 200 (i.e., control section 208) selects the A/N resource previously and explicitly notified by base station 100 as illustrated in FIG. 16B. Terminal 200 transmits the response signals (i.e., ACK/NACK signals) for the downlink data (DL data) received in Pcell using the selected A/N resource.

Figure 16C:
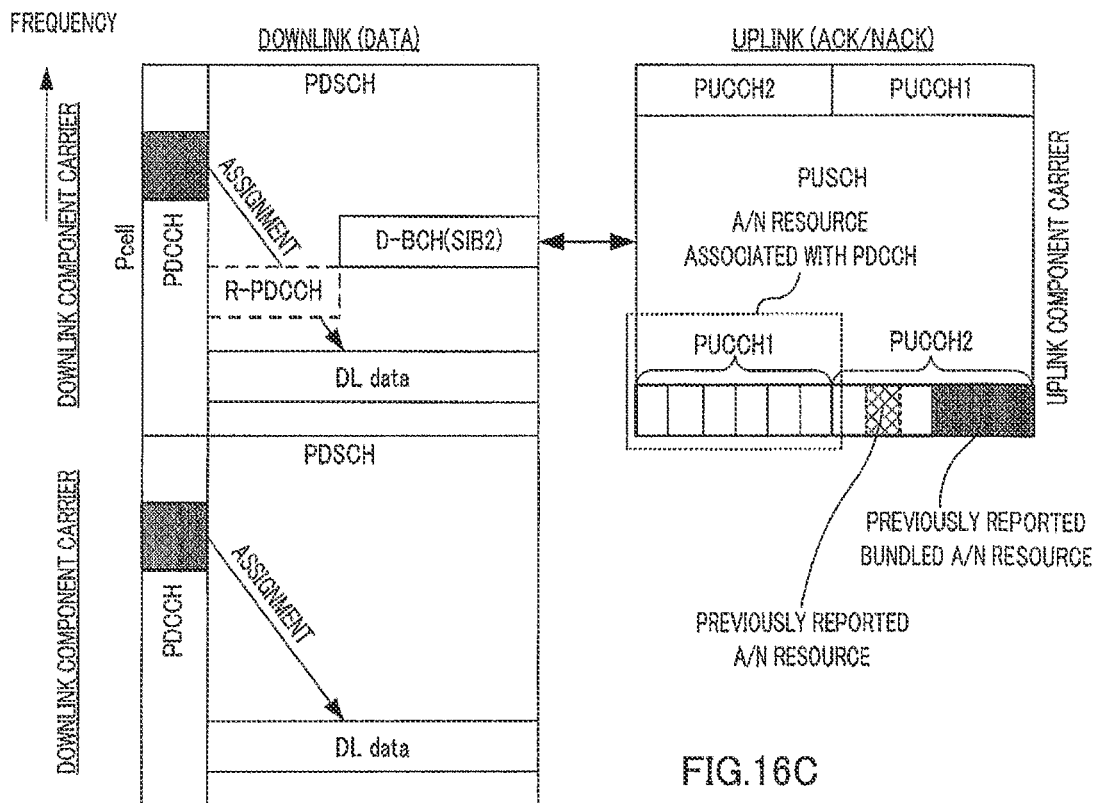
FIG. 16C illustrates control example 4 for transmission of response signals, according to Embodiment 1 of the claimed invention.

In addition, when receiving the downlink assignment control information intended for terminal 200 on the PDCCH in Pcell and also receiving the downlink assignment control information in the other downlink component carrier, terminal 200 (i.e., control section 208) selects the bundled A/N resource previously and explicitly notified by base station 100 as illustrated in FIG. 16C. Terminal 200 transmits the bundled A/N signals obtained by jointly encoding (i.e., joint coding) the response signals for the pieces of downlink data (DL data) received respectively in Pcell and in the other downlink component carrier using the selected bundled A/N resource.

Figure 16D:
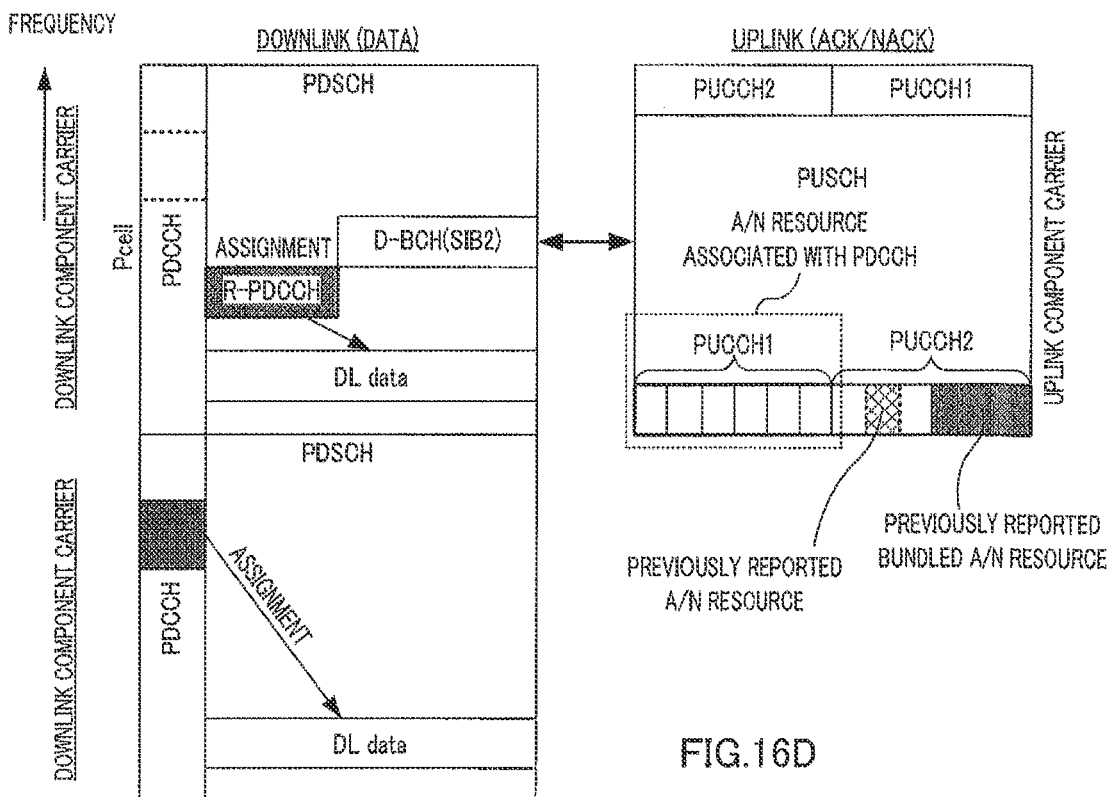
FIG. 16D illustrates control example 4 for transmission of response signals, according to Embodiment 1 of the claimed invention.

In addition, when receiving the downlink assignment control information intended for terminal 200 on the R-PDCCH in Pcell and also receiving the downlink assignment control information in the other downlink component carrier, terminal 200 (i.e., control section 208) selects the bundled A/N resource previously and explicitly notified by base station 100 as illustrated in FIG. 16D. Terminal 200 transmits the bundled ACK/NACK signals obtained by jointly encoding the response signals for the pieces of downlink data (DL data) received respectively in Pcell and in the other downlink component carrier using the selected bundled A/N resource.

In this manner, base station 100 can minimize an increase in the number of A/N resources to be secured for transmission of ACK/NACK signals for the downlink data assigned by the downlink assignment control information transmitted via an R-PDCCH, i.e., to minimize an increase in the overhead of PUCCH resources as in control example 3.

Moreover, although one bundled A/N resource and one A/N resource are previously and explicitly notified to terminal 200 by base station 100, it is not true that terminal 200 always uses the bundled A/N resource and the A/N resource for transmission of response signals. To put it more specifically, when receiving downlink assignment control information via the PDCCH in Pcell but receiving no downlink assignment control information in the other downlink component carrier, terminal 200 preferentially uses the PUCCH resource associated with the CCE that has been occupied by the PDCCH used for transmission of the downlink assignment control information in Pcell. To put it differently, the bundled A/N resource is used in terminals 200 only when necessary. Thus, a plurality of terminals 200 can share the same bundled A/N resource. Thus, base station 100 can control response signals from terminals 200 so as to avoid a collision between the response signals from terminals 200 while allowing a plurality of terminals 200 to share the same bundled A/N resource through the extremely simple scheduling as in the case of control example 3, thereby minimizing an increase in the overhead of PUCCH resources.

Moreover, in control example 3 (FIG. 15B), when receiving the downlink assignment control information intended for terminal 200 on the R-PDCCH in Pcell, but receiving no downlink assignment control information in the other downlink component carrier, terminal 200 transmits ACK/NACK signals using the bundled A/N resource. In other words, an excessive amount of resources is assigned to the transmission of ACK/NACK signals in control example 3 (FIG. 15B). In contrast to control example 3, terminal 200 transmits ACK/NACK signals using the A/N resource in control example 4 (FIG. 16B). In other words, an appropriate amount of resources is assigned to the transmission of ACK/NACK signals in control example 4. Accordingly, an increase in the overhead of the PUCCH resources can be further minimized compared with control example 3.

Accordingly, in control example 4, a plurality of terminals 200 can share the same A/N resource and bundled A/N resource while preferentially using the PUCCH resource previously associated with the CCE that has been occupied by the PDCCH in Pcell. Thus, the use efficiency of PUCCH resources can be improved with almost no additional limitations on a scheduler of base station 100. To put it differently, terminal 200 can efficiently transmit response signals even when receiving downlink assignment control information via an R-PDCCH in a case where the DFT-S-OFDM format is adopted.

In FIGS. 16A to 16D, the case where terminal 200 monitors an R-PDCCH region only in Pcell has been described. However, the operation of control example 4 can be applied to a case where terminal 200 monitors an R-PDCCH on a downlink component carrier other than Pcell, i.e., a case where an R-PDCCH is configured in a downlink component carrier other than Pcell.

Control examples 1 to 4 used for transmission of response signals have been described above.

As has been described, terminal 200 controls the transmission of response signals by selecting the resource used for transmission of the response signals, from the PUCCH resource associated with a CCE and a specific PUCCH resource previously notified by base station 100, according to whether downlink control information is mapped to a PDCCH or R-PDCCH (whether downlink control information is received on a PDCCH or R-PDCCH). Thus, terminal 200 can selectively use the PUCCH resource associated with a CCE and the specific PUCCH resource previously notified by base station 100 in accordance with the type of downlink control channel (i.e., PDCCH or R-PDCCH) or the reception condition of downlink control information. Accordingly, even when terminal 200 receives downlink assignment control information via an R-PDCCH, an increase in the number of PUCCH resources to be secured for transmission of response signals can be minimized while an increase in complexity of scheduling in base station 100 is also prevented.

In addition, base station 100 selects the resource used for transmission of response signals, from the PUCCH resource associated with a CCE and a specific PUCCH resource previously notified to terminal 200, according to whether the downlink control information is mapped to a PDCCH or R-PDCCH (i.e., whether the downlink control information is transmitted on the PDCCH or R-PDCCH). Accordingly, when transmitting downlink assignment control information to terminal 200 using either one of the downlink control channels, base station 100 can identify which resource is used for transmission of response signals by terminal 200.

Thus, according to Embodiment 1, terminals can efficiently transmit response signals when receiving downlink assignment control information via an R-PDCCH.

Embodiment 2

In Embodiment 2, a description will be provided regarding a case where a certain terminal transmits uplink data and response signals for downlink data in the same subframe (i.e., the same transmission timing).

The basic configuration of a base station according to Embodiment 2 is common to that of Embodiment 1. Accordingly, a description will be herein provided with reference to FIG. 11.

Figure 17:
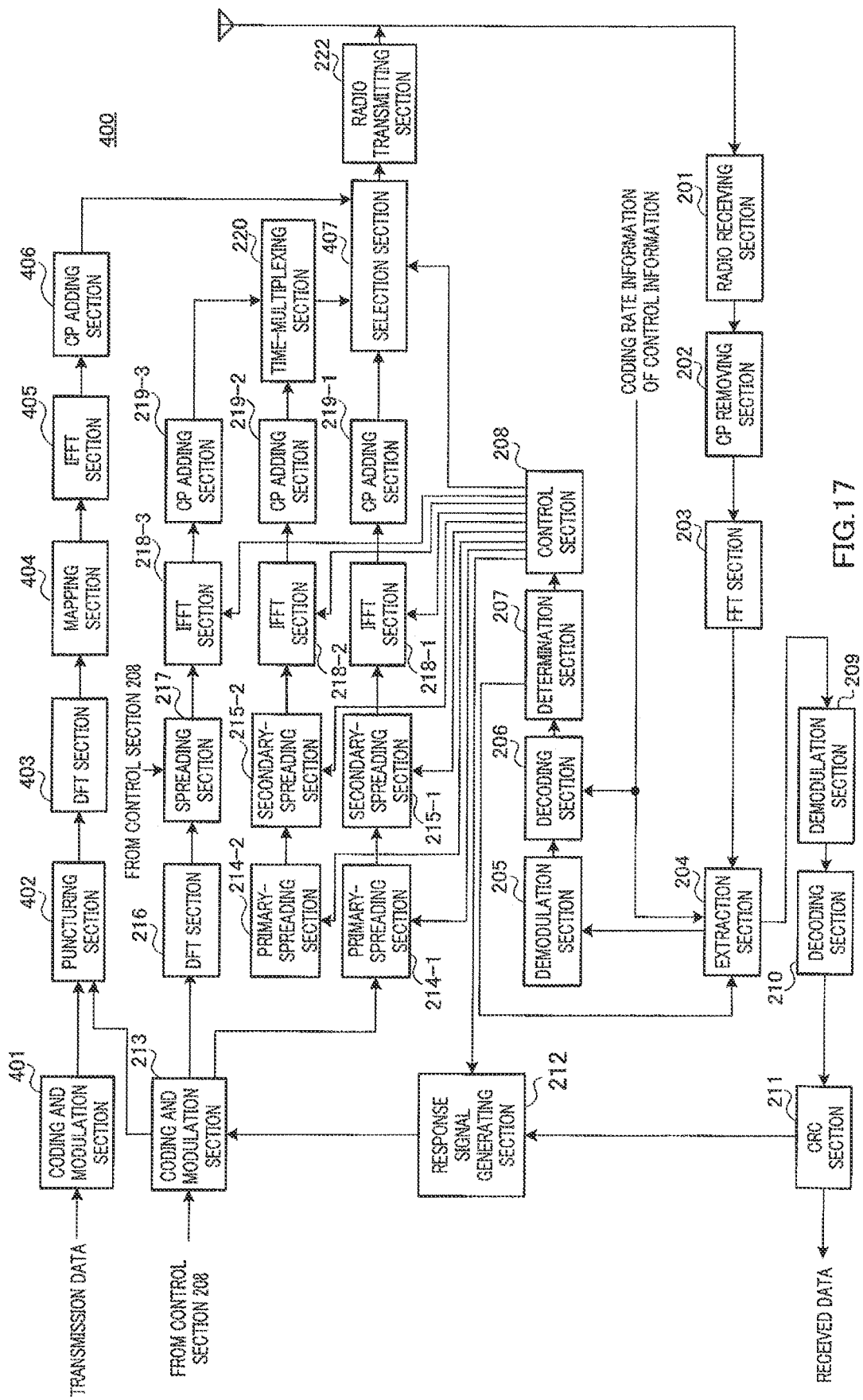
FIG. 17 is a block diagram illustrating a terminal according to Embodiment 2 of the claimed invention.

Moreover, FIG. 17 is a block diagram illustrating the configuration of a terminal according to Embodiment 2. In terminal 400 illustrated in FIG. 17, the same configuration elements as those illustrated in Embodiment 1 (FIG. 12) are assigned the same reference numerals and any duplicate description of the elements is omitted.

In terminal 400 illustrated in FIG. 17, in addition to the same processing as that in Embodiment 1, control section 208 instructs coding and modulation section 213 to output the response signals that have undergone coding and modulation to puncturing section 402 when there are data signals to be transmitted (i.e., transmission data) in a subframe to be used for the transmission of response signals (i.e., bundled ACK/NACK signals or ACK/NACK signals). Meanwhile, when there are no data signals to be transmitted (i.e., transmission data) in a subframe to be used for the transmission of response signals, control section 208 instructs coding and modulation section 213 to output the response signals that have undergone coding and modulation (i.e., bundled ACK/NACK signals or ACK/NACK signals) to DFT section 216 or primary-spreading section 214-1 as in the case of Embodiment 1.

Coding and modulation section 401 encodes and modulates the transmission data and outputs the data signals resulting from coding and modulation to puncturing section 402.

Upon reception of the response signals from coding and modulation section 213, puncturing section 402 decimates (i.e., punctures) part of the data signals received from coding and modulation section 401 and outputs the signals resulting from the puncturing to DFT section 403. Meanwhile, when receiving no response signals from coding and modulation section 213, puncturing section 402 outputs the data signals received from coding and modulation section 401 to DFT section 403 without decimating part of the data signals. As described, when there are data signals to be transmitted in a subframe to be used for the transmission of response signals, the response signals are assigned to a PUSCH.

DFT section 403 transforms the signals received from puncturing section 402 into frequency-domain signals and outputs the obtained plurality of frequency components to mapping section 404. Mapping section 404 maps the plurality of frequency components received from DFT section 403 to a PUSCH assigned in an uplink component carrier. IFFT section 405 transforms the plurality of frequency components mapped to the PUSCH into a time-domain waveform, and CP adding section 406 adds a CP to the time-domain waveform.

Selection section 407 selects one of the bundled ACK/NACK resource received from time-multiplexing section 220, the A/N resource received from CP adding section 219-1, and the PUSCH resource received from CP adding section 406 and outputs the signals assigned to the selected resource to radio transmitting section 222.

(Operations of Base Station 100 and Terminal 400)

A description will be provided regarding operations of base station 100 and terminal 400 configured in the manner described above. In the following description, an example of a case without carrier aggregation as in the case of control example 1 of Embodiment 1 will be described.

Figure 7:
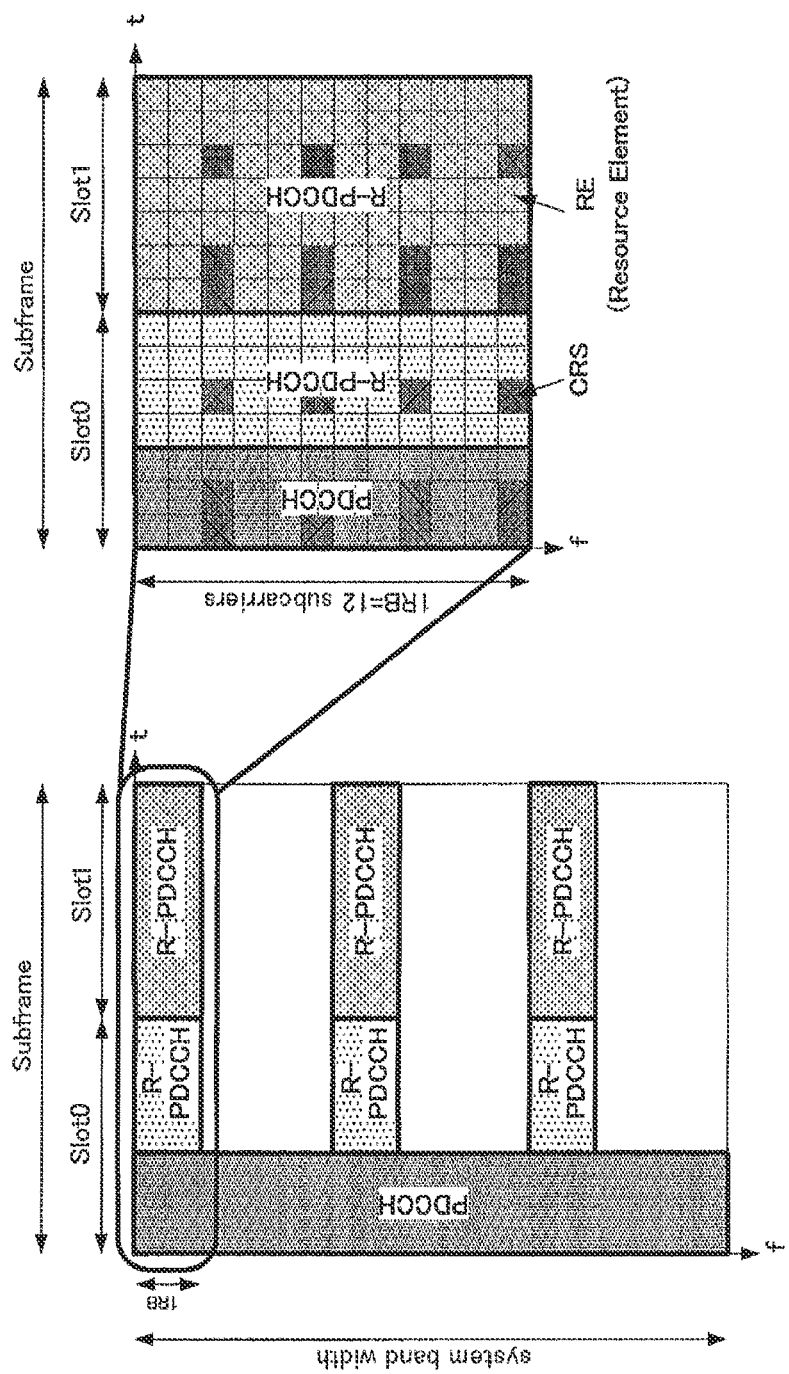
FIG. 7 is a diagram illustrating R-PDCCH regions.
Figure 8:
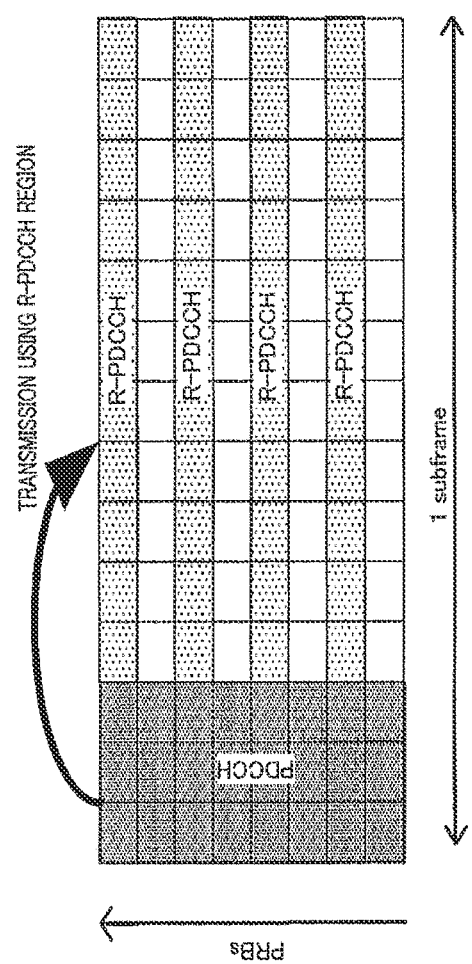
FIG. 8 is a diagram provided for describing a mapping example of PDCCH.
Figures 18A, 18B:
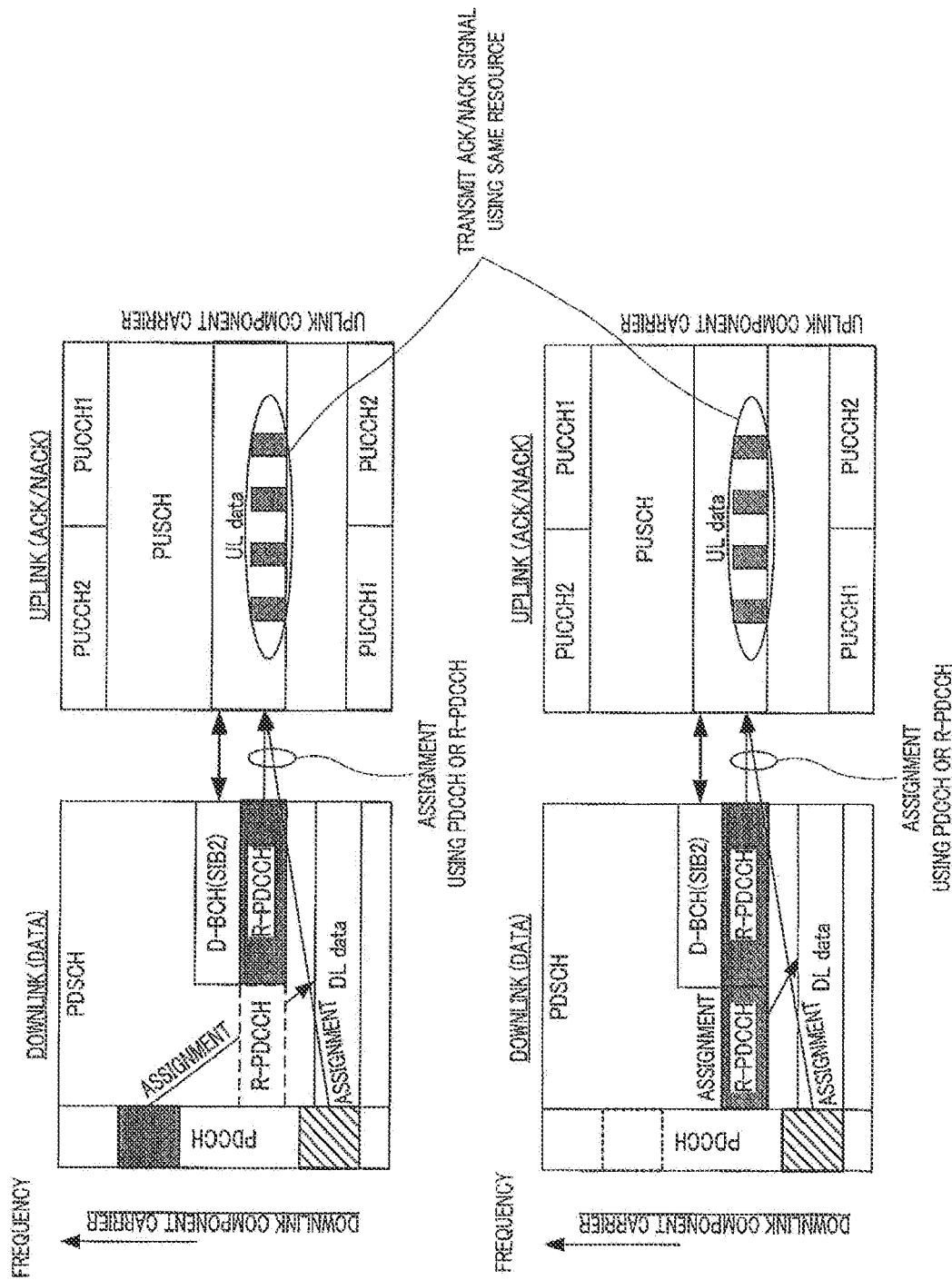
FIGS. 18A and 18B illustrate control example 2 for transmission of response signals, according to Embodiment 2 of the claimed invention.

As illustrated in FIGS. 18A and 18B, base station 100 according to Embodiment 2 transmits downlink assignment control information (i.e., downlink assignment) using a PDCCH region or R-PDCCH region (e.g., R-PDCCH region in slot 0 illustrated in FIG. 7). In addition, base station 100 transmits uplink assignment control information (i.e., UL grant) using a PDCCH region or R-PDCCH region (e.g., R-PDCCH region in slot 1 as illustrated in FIG. 7). Moreover, base station 100 may transmit uplink assignment control information simultaneously with downlink assignment control information in a certain subframe to terminal 400.

Meanwhile, terminal 400 performs blind-decoding (monitoring) in both of the PDCCH region and R-PDCCH region to detect the downlink assignment control information or uplink assignment control information intended for terminal 400.

During the blind-decoding, when detecting only the downlink assignment control information intended for terminal 400, terminal 400 transmits response signals using a PUCCH as in the case of control example 1 of Embodiment 1. To put it differently, terminal 400 determines the resource used for transmission of response signals (i.e., A/N resource) in accordance with the downlink control channel (i.e., PDCCH or R-PDCCH) used for transmission of the downlink assignment control information.

Meanwhile, when detecting both of the downlink assignment control information and uplink assignment control information intended for terminal 400 in a certain subframe, i.e., when transmitting the uplink data and the response signals for the downlink data in the same subframe, terminal 400 multiplexes the uplink data (Data) and the response signals (A/N) in the PUSCH region and transmits the multiplexed data and signals.

To put it more specifically, as illustrated in FIGS. 18A and 18B, upon reception of the downlink assignment control information and the uplink assignment control information in a certain subframe, terminal 400 transmits the response signals using the same resource in the PUSCH region (i.e., PUSCH resources in the PUSCH indicated by the uplink assignment control information), regardless of whether the downlink assignment control information intended for terminal 400 is received via the PDCCH (FIG. 18A) or R-PDCCH (FIG. 18B). In other words, terminal 400 transmits response signals using part of the PUSCH resources to which uplink data (UL data) is assigned (i.e., the part of the uplink data is punctured due to response signals) as illustrated in FIGS. 18A and 18B.

As described above, upon reception of only downlink assignment control information (no uplink assignment control information), terminal 400 can improve the use efficiency of PUCCH resources as in the case of Embodiment 1. In addition, upon reception of uplink assignment control information simultaneously with downlink assignment control information, terminal 400 transmits response signals using PUSCH resources without using any PUCCH resource. In this manner, terminal 400 can appropriately transmit response signals while reducing the overhead of the PUCCH resources required for transmission of response signals in accordance with the presence or absence of uplink assignment control information.

According to Embodiment 2, upon reception of downlink assignment control information via an R-PDCCH, terminals can efficiently transmit response signals as in the case of Embodiment 1.

Embodiment 2 can be applied not only to control example 1 of Embodiment 1, but also to control examples 2 to 4 (where carrier aggregation is employed).

In other words, when detecting only downlink assignment control information intended for terminal 400, terminal 400 may determine the A/N resource in accordance with one of control examples 1 to 4 of Embodiment 1.

Embodiments 1 and 2 of the claimed invention have been described above.

In the above described embodiments, ZAC sequences, Walsh sequences, and DFT sequences are described as examples of the sequences used for spreading. However, instead of ZAC sequences, sequences that can be separated using different cyclic shift values, other than ZAC sequences may be used. For example, the following sequences may be used for primary-spreading: generalized chirp like (GCL) sequences; constant amplitude zero auto correlation (CAZAC) sequences; zadoff-chu (ZC) sequences; PN sequences such as M sequences or orthogonal Gold code sequences; or sequences having a steep autocorrelation characteristic on the time axis randomly generated by computer. In addition, instead of Walsh sequences and DFT sequences, any sequences may be used as orthogonal code sequences as long as the sequences are mutually orthogonal or considered to be substantially orthogonal to each other. In the above-mentioned description, the resource of response signals (e.g., A/N resource and bundled ACK/NACK resource) is defined by the frequency position, cyclic shift value of the ZAC sequence and sequence number of the orthogonal code sequence.

Moreover, control section 101 of base station 100 is configured to control mapping in such a way that downlink data and the downlink assignment control information for the downlink data are mapped to the same downlink component carrier in the embodiments described above, but is not limited to this configuration. To put it differently, even if downlink data and the downlink assignment control information for the downlink data are mapped to different downlink component carriers, the technique described in each of the embodiments can be applied as long as the correspondence between the downlink assignment control information and the downlink data is clear.

Furthermore, as the processing sequence in terminals, the case where IFFT transform is performed after the primary-spreading and secondary-spreading has been described. However, the processing sequence in terminals is not limited to this sequence. As long as IFFT processing is performed after the primary-spreading processing, an equivalent result can be obtained regardless of the position of the secondary-spreading processing.

In each of the embodiments, the description has been provided with antennas, but the claimed invention can be applied to antenna ports in the same manner.

The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, 3GPP LTE does not specify the number of physical antennas forming an antenna port, but specifies an antenna port as a minimum unit allowing base stations to transmit different reference signals.

In addition, an antenna port may be specified as a minimum unit to be multiplied by a precoding vector weighting.

The above-noted embodiments have been described by examples of hardware implementations, but the claimed invention can be also implemented by software in conjunction with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of the specification, the drawings, and the abstract included in Japanese Patent Application No. 2010-197768, filed on Sep. 3, 2010, is incorporated herein by reference in its entirety.

INDUSTRIAL APPLICABILITY

The claimed invention can be applied to mobile communication systems and/or the like.

Reference Signs List

| | |
|---|---|
| 100 | Base station |
| 101, 208 | Control section |
| 102 | Control information generating section |
| 103 | Coding section |
| 104 | Modulation section |
| 105 | Coding section |
| 106 | Data transmission controlling section |
| 107 | Modulation section |
| 108, 404 | Mapping section |
| 109 218-1, 218-2, 218-3, 405 | IFFT section |
| 110, 219-1, 219-2, 219-3, 406 | CP adding section |
| 111, 222 | Radio transmitting section |
| 112, 201 | Radio receiving section |
| 113, 202 | CP removing section |
| 114 | PUCCH extracting section |
| 115 | Despreading section |
| 116 | Sequence controlling section |
| 117 | Correlation processing section |
| 118 | A/N determining section |
| 119 | Bundled A/N despreading section |
| 120 | IDFT section |
| 121 | Bundled A/N determining section |
| 122 | Retransmission control signal generating section |
| 200, 400 | terminal |
| 203 | FFT section |
| 204 | Extraction section |
| 205, 209 | Demodulation section |
| 206, 210 | Decoding section |
| 207 | Determination section |
| 211 | CRC section |
| 212 | Response signal generating section |
| 213, 401 | Coding and modulation section |
| 214-1, 214-2 | Primary-spreading section |
| 215-1, 215-2 | Secondary-spreading section |
| 216, 403 | DFT section |

-continued

Reference Signs List

| | |
|---|---|
| 217 | Spreading section |
| 220 | Time-multiplexing section |
| 221, 407 | Selection section |
| 402 | Puncturing section |

The invention claimed is:

1. An integrated circuit to control a process, the process comprising:

receiving downlink assignment information indicating a resource in a primary cell, first downlink data on the resource in the primary cell, and second downlink data in a secondary cell; and transmitting a response signal for the first downlink data and the second downlink data, wherein in response to receiving the downlink assignment information in a first control channel on a Control Channel Element (CCE) of a Physical Downlink Control Channel (PDCCH) region, the transmitting includes transmitting the response signal on one of a first set of uplink resources including a first resource, the first resource determined by a first method, wherein the first method determines the first resource based on an index of the CCE of the PDCCH region on which the downlink assignment information is received; and in response to receiving the downlink assignment information in a second control channel different from the first control channel, the transmitting includes transmitting the response signal on one of a second set of uplink resources including a second resource, the second resource determined by a second method different from the first method.

2. The integrated circuit according to claim 1, comprising:

circuitry which, in operation, controls the process;

at least one input coupled to the circuitry, wherein the at least one input, in operation, inputs data; and at least one output coupled to the circuitry, wherein the at least one output, in operation, outputs data.

3. The integrated circuit according to claim 1, wherein the transmitting includes transmitting the response signal on the second resource in a format that includes plural response signals in a concatenated form.

4. The integrated circuit according to claim 1, wherein the second method determines the second resource without regard to the index of the CCE of the PDCCH region.

5. The integrated circuit according to claim 1, wherein the second method determines the second resource based on information signaled per terminal from a base station without regard to the index of the CCE of the PDCCH region.

6. The integrated circuit according to claim 1, wherein the receiving includes receiving the downlink assignment information in the second control channel on a Physical Downlink Shared Channel (PDSCH) region that is different from the PDCCH region.

7. The integrated circuit according to claim 1, wherein the transmitting includes transmitting the response signal on a resource allocated to uplink data together with the uplink data.

8. An integrated circuit comprising circuitry, which, in operation:

controls receiving downlink assignment information indicating a resource in a primary cell, first downlink data on the resource in the primary cell, and second downlink data in a secondary cell; and controls transmitting a response signal for the first downlink data and the second downlink data, wherein in response to receiving the downlink assignment information in a first control channel on a Control Channel Element (CCE) of a Physical Downlink Control Channel (PDCCH) region, the transmitting includes transmitting the response signal on one of a first set of uplink resources including a first resource, the first resource determined by a first method, wherein the first method determines the first resource based on an index of the CCE of the PDCCH region on which the downlink assignment information is received; and in response to receiving the downlink assignment information in a second control channel different from the first control channel, the transmitting includes transmitting the response signal on one of a second set of uplink resources including a second resource, the second resource determined by a second method different from the first method.

9. The integrated circuit according to claim 8, comprising:

at least one input coupled to the circuitry, wherein the at least one input, in operation, inputs data; and at least one output coupled to the circuitry, wherein the at least one output, in operation, outputs data.

10. The integrated circuit according to claim 8, wherein the transmitting includes transmitting the response signal on the second resource in a format that includes plural response signals in a concatenated form.

11. The integrated circuit according to claim 8, wherein the second method determines the second resource without regard to the index of the CCE of the PDCCH region.

12. The integrated circuit according to claim 8, wherein the second method determines the second resource based on information signaled per terminal from a base station without regard to the index of the CCE of the PDCCH region.

13. The integrated circuit according to claim 8, wherein the receiving includes receiving the downlink assignment information in the second control channel on a Physical Downlink Shared Channel (PDSCH) region that is different from the PDCCH region.

14. The integrated circuit according to claim 8, wherein the transmitting includes transmitting the response signal on a resource allocated to uplink data together with the uplink data.

* * * * *